US011406070B2

(12) United States Patent
Matsushiro et al.

(10) Patent No.: US 11,406,070 B2
(45) Date of Patent: Aug. 9, 2022

(54) CAP ASSEMBLY FOR MUSHROOM CULTIVATION BOTTLE

(71) Applicant: HOKUTO CORPORATION, Nagano (JP)

(72) Inventors: Keisuke Matsushiro, Nagano (JP); Shintaro Nakagoshi, Nagano (JP); So Sakuraba, Nagano (JP); Yohei Ohtoshi, Nagano (JP); Kenji Ouchi, Nagano (JP); Satoshi Natomi, Nagano (JP)

(73) Assignee: Hokuto Corporation, Nagano (JP)

( * ) Notice: Subject to any disclaimer, the term of this patent is extended or adjusted under 35 U.S.C. 154(b) by 52 days.

(21) Appl. No.: 16/608,338

(22) PCT Filed: Oct. 27, 2017

(86) PCT No.: PCT/JP2017/039012
§ 371 (c)(1),
(2) Date: Oct. 25, 2019

(87) PCT Pub. No.: WO2018/198404
PCT Pub. Date: Nov. 1, 2018

(65) Prior Publication Data
US 2020/0187431 A1 Jun. 18, 2020

(30) Foreign Application Priority Data

Apr. 27, 2017 (JP) .............................. JP2017-088601

(51) Int. Cl.
*A01G 18/65* (2018.01)
*A01G 18/00* (2018.01)
(Continued)

(52) U.S. Cl.
CPC .............. *A01G 18/00* (2018.02); *A01G 18/64* (2018.02); *A01G 18/65* (2018.02); *A01G 18/68* (2018.02); *A01G 18/70* (2018.02)

(58) Field of Classification Search
CPC ........ A01G 18/00; A01G 18/61; A01G 18/64; A01G 18/65; A01G 18/68; A01G 18/70
See application file for complete search history.

(56) References Cited

U.S. PATENT DOCUMENTS 4,873,195 A * 10/1989 Kubo ...................... A01G 18/64
47/1.1
5,372,615 A * 12/1994 Mizuno ................... A01G 18/64
47/1.1
(Continued)

FOREIGN PATENT DOCUMENTS

FR        43355 E   *  5/1934 ............. A01G 18/64
JP    03219805 A   *  9/1991
(Continued)

OTHER PUBLICATIONS

PCT International Search Report for International Application No. PCT/JP2017/039012, dated Jan. 23, 2018, 3 pages.
(Continued)

*Primary Examiner* — Monica L Barlow
*Assistant Examiner* — Michael A. Fabula
(74) *Attorney, Agent, or Firm* — Hoffman Warnick LLC

(57) ABSTRACT

A cap assembly for a cultivation bottle for growing mushrooms is provided. The cap assembly (10) includes a bottle fitting member (20) configured to fit onto a mouth part (54) of the cultivation bottle (50) and a bowl-shaped member (30) configured to be placed on the bottle fitting member. The cap assembly being connected to the bottle prior to fruiting such that the mushrooms grow up through the mouth of the bottle and the attached cap assembly. The bowl-shaped member being separable from the bottle and attached
(Continued)

bottle fitting member to facilitate harvesting of the mushroom fruiting bodies and removal of a section of the elongated hard tip portion.

16 Claims, 37 Drawing Sheets

(51) Int. Cl.
    *A01G 18/70*    (2018.01)
    *A01G 18/68*    (2018.01)
    *A01G 18/64*    (2018.01)

(56) References Cited

U.S. PATENT DOCUMENTS

| | | | | |
|---|---|---|---|---|
| 5,372,616 | A | * | 12/1994 | Mizuno .................. A01G 18/64 47/1.1 |
| 2005/0178054 | A1 | * | 8/2005 | Hsu ........................ A01G 18/64 47/1.1 |
| 2006/0112618 | A1 | * | 6/2006 | Kawai .................... A01G 18/00 47/1.1 |

FOREIGN PATENT DOCUMENTS

| | | | | |
|---|---|---|---|---|
| JP | 03172118 | A | * | 10/1991 |
| JP | H05227840 | A | | 9/1993 |
| JP | 3025112 | U | | 6/1996 |
| JP | H09135627 | A | | 5/1997 |
| JP | 09201130 | A | * | 8/1997 |
| JP | 11196668 | A | * | 7/1999 |
| JP | H11196668 | A | | 7/1999 |
| JP | 2000300067 | A | | 10/2000 |
| JP | 2002027830 | A | * | 1/2002 |
| JP | 2002159218 | A | * | 6/2002 |
| JP | 2002218844 | A | | 8/2002 |
| JP | 2004147668 | A | | 5/2004 |
| JP | 2005046050 | A | * | 2/2005 |
| JP | 2006025616 | A | * | 2/2006 |
| JP | 2006223264 | A | * | 8/2006 |
| JP | 2007020479 | A | * | 2/2007 |
| JP | 2007110956 | A | * | 5/2007 |
| JP | 2007215417 | A | | 8/2007 |
| JP | 2007236318 | A | | 9/2007 |
| JP | 2007306807 | A | | 11/2007 |
| JP | 2007306807 | A | * | 11/2007 |
| JP | 4307520 | B1 | * | 8/2009 |
| JP | 2009171878 | A | * | 8/2009 |
| JP | 2009171878 | A | | 8/2009 |
| JP | 2011103776 | A | * | 6/2011 |
| JP | 2014161242 | A | | 9/2014 |
| JP | 2017216995 | A | * | 12/2017 |
| JP | 2018143174 | A | * | 9/2018 |

OTHER PUBLICATIONS

Extended European Search Report for Application No. 17906851.5, dated Nov. 23, 2020, 8 pages.
Japanese Office Action and English Translation thereof for JP Application No. 2020-185947 dated Jan. 18, 2022, 4 pages.

* cited by examiner

PRIOR ART

CAP ASSEMBLY FOR MUSHROOM
CULTIVATION BOTTLE

TECHNICAL FIELD

The present invention relates to a cap placed over the mouth of a cultivation bottle used in the cultivation of brown beech mushrooms (*Hypsizygus marmoreus*) to neaten the shape of the brown beech mushroom clump and to facilitate harvesting.

BACKGROUND ART

Hitherto, in mushroom cultivation employing cultivation bottles, a cap is placed over the cultivation bottle mouth to neaten the shape of the mushroom clump and to facilitate harvesting. See, for example, Japanese Patent Application Laid-Open (JP-A) Nos. H05-227840, 2002-218844, 2004-147668, 2007-215417, 2007-236318, 2007-306807, 2009-171878, and 2014-161242.

SUMMARY OF INVENTION

Technical Problem

Owing to the nature of brown beech mushroom cultivation, brown beech mushrooms are sold packaged in a state in which raw material of a culture medium such as sawdust or corncobs remain adhered to a hard tip part of the mushrooms. The hard tip part to which the raw material of culture medium has adhered cannot be eaten, and the packaging accordingly displays instructions to remove the hard tip part during preparation. However, even when the hard tip part is cut off during the preparation process, the raw material of culture medium often still finds its way into cooked food.

Recently, brown beech mushrooms are also sold in a state in which the hard tip part has been cut off. However, brown beech mushrooms from which the hard tip part has been cut off are sold in a loose state separated into individual heads. Such a condition is not suited to dishes such as tempura for which it is desirable to use clusters of several mushroom heads, and can therefore be an impediment when cooking.

Moreover, when the hard tip part is cut off along a flat plane, some edible parts are wasted. Methods to cut in planes that rise to a peak toward the center are therefore known. However, even in such cases the mushrooms can begin to separate, leading to inconvenience such as a clump that was maintained during cutting breaking apart during transit.

The present inventors have developed a cultivation method in which the hard tip part of brown beech mushrooms is firmed up and encouraged to grow somewhat elongated during the cultivation process such that the raw material of culture medium is not lifted up with the mushroom clump, thereby enabling the brown beech mushrooms to be harvested in a clump without the hard tip part, and without the mushroom heads separating even when the hard tip part has been cut off. The present application provides this cultivation method and cultivation tools utilized in this cultivation.

Solution to Problem (1) First Aspect

In consideration of the above, a first aspect of the present application is a cap for a cultivation bottle for brown beech mushrooms. The cap for a cultivation bottle for brown beech mushrooms includes a cylindrical member that is fitted onto a wide-mouth part of a cultivation bottle. The cylindrical member includes a large-diameter cylindrical part that covers and is fitted to an end edge of the wide-mouth part and an outer surface in a vicinity of the end edge, a small-diameter cylindrical part that has a first opening with a smaller diameter than the large-diameter cylindrical part and that is positioned toward a center of the large-diameter cylindrical part, and a connecting part that connects an outer peripheral edge of the large-diameter cylindrical part with the small-diameter cylindrical part. A height of an inner surface of the small-diameter cylindrical part is from 6 mm to 30 mm.

The "cylindrical member" is a member formed to be fitted onto the wide-mouth part of the brown beech mushroom cultivation bottle. The cylindrical member includes two substantially circular cylindrical portions, namely the large-diameter cylindrical part and the small-diameter cylindrical part, that have different diameters to each other, and the connecting part that connects the large-diameter cylindrical part and the small-diameter cylindrical part together.

Namely, the first opening configuring an opening in the small-diameter cylindrical part is narrower than an opening in the wide-mouth part. A location above an annular portion of the wide-mouth part positioned at the peripheral outside of the small-diameter cylindrical part is restricted by the connecting part. The base of a brown beech mushroom clump growing from the wide-mouth part is thus constrained by the internal diameter of the small-diameter cylindrical part. Since the height of the inner surface of the small-diameter cylindrical part is from 6 mm to 30 mm, a hard tip part of the brown beech mushrooms can be made to grow to this height.

Note that were the height of the inner surface to be less than 6 mm, the likelihood of contamination from a culture medium and spawn increases even after the hard tip part has been cut off from the grown brown beech mushroom. It is also difficult to cut off the hard tip part in a manner in which the clump does not come apart in transit. Conversely, were the height of the inner surface to be more than 30 mm, the hard tip part would become unnecessarily long, extending the growing period and pushing up the cost of cultivation. Accordingly, a height of from 6 mm to 30 mm is appropriate for the inner surface in order to enable the hard tip part to be cut off easily without contamination from the culture medium, while avoiding an increase in the growing period.

Note that a lower edge of the inner face of the small-diameter cylindrical part may be aligned with a lower face of the connecting part. However, the lower edge may project below the lower face of the connecting part as long as the height of the inner surface is secured.

(2) Second Aspect

A second aspect of the present application is the first aspect, wherein a proportional opening size of the first opening of the small-diameter cylindrical part is from 30% to 90% of that of an opening of the wide-mouth part.

Here, "proportional opening size" refers to the relative proportions of the respective opening areas. Setting the proportional opening size in this manner enables the hard tip part of the brown beech mushroom product to be firmly pressed, resulting in easier cutting.

(3) Third Aspect

A third aspect of the present application is either the first aspect or the second aspect, further including a bowl-shaped member separate from the cylindrical member and configured to be placed on the cylindrical member. The bowl-shaped member includes a second opening with a larger diameter than an external diameter of the small-diameter cylindrical part, and a corrective part rising upward in a bowl shape from a peripheral edge of the second opening.

Here, the "bowl-shaped member" refers to a member formed so as to be placed on the cylindrical member such that the growing brown beech mushroom clump spreads in a bowl shape. The bowl-shaped member is simply placed on the cylindrical member in a state in which the small-diameter cylindrical part is housed within the second opening of the bowl-shaped member. Since there is no engagement with the cylindrical member, the bowl-shaped member can be removed without encountering any particular resistance by being lifted upward. Accordingly, after the brown beech mushrooms have finished growing, the hard tip part can be pulled away from the cultivation bottle simply by lifting up the bowl-shaped member.

(4) Fourth Aspect

A fourth aspect of the present application is the third aspect, further including a cylindrical corrective cylinder projecting upward from an upper end edge of the corrective part.

Namely, in the fourth aspect, the corrective cylinder is formed as a cylindrical rather than bowl shaped location above the corrective part. The growing brown beech mushroom clump is shaped so as to spread in a bowl shape by the corrective part and the corrective cylinder.

(5) Fifth Aspect

A fifth aspect of the present application is the fourth aspect, further including a flange-shaped rib projecting outward from an outer peripheral surface of the corrective cylinder.

In the fifth aspect, the rib abuts an upper edge of the corrective cylinder of the bowl-shaped member positioned below the rib when two or more of the bowl-shaped members are stacked in storage, thereby preventing the bowl-shaped members from becoming stuck inside each other such that they cannot be separated, and also improving stability when stacked. Moreover, machine compatibility is improved by for example performing positioning with the rib when a process to cut off the hard tip part of the clump is automated.

(6) Sixth Aspect

A sixth aspect of the present application is either the first or the second aspect, further including a bowl-shaped member separate from the cylindrical member and configured to be placed on the cylindrical member. The bowl-shaped member includes a second opening with a larger diameter than an external diameter of the small-diameter cylindrical part, a placement part configuring a portion with an annular flat surface provided around the second opening and placed on the connecting part, and a corrective part rising upward in a bowl shape from a peripheral edge of the placement part.

Namely, in the sixth aspect, the placement part is interposed such that the corrective part rises upward in a bowl shape from the peripheral edge of the placement part instead of rising directly upward from the peripheral edge of the second opening.

(7) Seventh Aspect

A seventh aspect of the present application is the sixth aspect, further including an outer-insertion part projecting downward from the peripheral edge of the placement part in a cylindrical shape so as to surround an outer periphery of the large-diameter cylindrical part.

Namely, in the seventh aspect, when the placement part of the bowl-shaped member is placed on the connecting part of the cylindrical member, the outer-insertion part of the bowl-shaped member surrounds the outer periphery of the large-diameter cylindrical part of the cylindrical member. This increases stability when the bowl-shaped member is mounted to the cylindrical member.

(8) Eighth Aspect

An eighth aspect of the present application is a cap for a cultivation bottle for brown beech mushrooms. The cap for a cultivation bottle for brown beech mushrooms includes a cylindrical member that is fitted onto a wide-mouth part of a cultivation bottle, and a bowl-shaped member that is separate from the cylindrical member and that is placed on the cylindrical member. The cylindrical member includes a large-diameter cylindrical part that covers and is fitted to an end edge of the wide-mouth part and an outer surface in a vicinity of the end edge, a small-diameter cylindrical part that has a first opening with a smaller diameter than the large-diameter cylindrical part and that is positioned toward a center of the large-diameter cylindrical part, and a connecting part that connects an outer peripheral edge of the large-diameter cylindrical part with the small-diameter cylindrical part. The bowl-shaped member includes an upper cylindrical part that has a second opening with substantially a same diameter as an internal diameter of the first opening, and a corrective part rising upward in a bowl shape from a peripheral edge of the second opening. The bowl-shaped member is placed on the small-diameter cylindrical part, and a total height of an inner surface of the small-diameter cylindrical part and an inner surface of the upper cylindrical part is from 6 mm to 30 mm.

The "cylindrical member" is a member formed to be fitted onto the wide-mouth part of the brown beech mushroom cultivation bottle. The cylindrical member includes two substantially circular cylindrical portions, namely the large-diameter cylindrical part and the small-diameter cylindrical part, that have different diameters to each other, and the connecting part that connects the large-diameter cylindrical part and the small-diameter cylindrical part together.

Namely, the first opening configuring an opening in the small-diameter cylindrical part is narrower than an opening in the wide-mouth part. A location above an annular portion of the wide-mouth part positioned at the outer side of the small-diameter cylindrical part is restricted by the connecting part. The base of a brown beech mushroom clump growing from the wide-mouth part is thus constrained by the internal diameter of the small-diameter cylindrical part.

The "bowl-shaped member" is a member formed so as to be placed on the cylindrical member such that the growing brown beech mushroom clump spreads in a bowl shape. The upper cylindrical part of the bowl-shaped member is placed on the small-diameter cylindrical part in a state in which the upper cylindrical part is aligned with the small-diameter cylindrical part, such that the bowl-shaped member can be removed without encountering any particular resistance by being lifted upward with respect to the cylindrical member. Accordingly, after the brown beech mushrooms have finished growing, the hard tip part can be pulled away from the cultivation bottle simply by lifting up the bowl-shaped member.

In the eighth aspect, the total height of the inner surface of the small-diameter cylindrical part and the inner surface of the upper cylindrical part is from 6 mm to 30 mm, enabling the hard tip part of the brown beech mushrooms to be made to grow to this height. The significance of the total height of the inner surfaces being from 6 mm to 30 mm is similar to that described with reference to the first aspect. In the eighth aspect, this height may be achieved in combination with the height of the upper cylindrical part of the bowl-shaped member instead of by the small-diameter cylindrical part alone.

Note that a lower edge of the inner surface of the small-diameter cylindrical part may be aligned with the connecting part. However, the lower edge may project below the connecting part as long as the height of the inner surface is secured.

(9) Ninth Aspect

A ninth aspect of the present application is the eighth aspect, wherein a proportional opening size of the first opening of the small-diameter cylindrical part is from 30% to 90% of that of an opening of the wide-mouth part.

Here, "proportional opening size" refers to the relative proportions of the respective opening areas. Setting the proportional opening size in this manner enables the hard tip part of the brown beech mushroom product to be firmly pressed, resulting in easier cutting.

(10) Tenth Aspect

A tenth aspect of the present application is of any one of the third aspect to the ninth aspect, wherein the small-diameter cylindrical part projects upward from the connecting part.

This projecting part maintains stability when placing the bowl-shaped member, suppressing the bowl-shaped member from falling off even if subjected to a moderate shock during a task.

(11) Eleventh Aspect

An eleventh aspect of the present application is either the first aspect or the second aspect, further including a bowl-shaped member that is separate from the cylindrical member and that is placed on a shoulder part of the cultivation bottle. The bowl-shaped member has a truncated substantially circular conical shape with an increasing diameter on progression upward.

(12) Twelfth Aspect

A twelfth aspect of the present application is a method for cultivation and harvest of brown beech mushrooms employing the cap for a cultivation bottle for brown beech mushrooms according to either the first aspect or the second aspect. The method includes mounting the cylindrical member at a location where a brown beech mushroom will grow from a mushroom bed, and cutting off a hard tip part of a harvested brown beech mushroom at a midsection location after growth of the brown beech mushroom has ended.

The "location where a brown beech mushroom will grow" refers to the wide-mouth part when employing a cultivation bottle, or any desired location where the clump is encouraged to grow when employing a box-shaped mushroom bed to grow plural clumps. By placing the cap for a cultivation bottle for brown beech mushrooms at such a location, the hard tip part of each clump can be made to grow in a state appropriately constrained by the internal diameter of the small-diameter cylindrical part. The hard tip part can easily be cut off at a midsection location after harvesting, enabling the culture medium to be eliminated from the brown beech mushroom product.

Note that in the twelfth aspect, the stage of the cultivation process at which the cap for a cultivation bottle for brown beech mushrooms is mounted is not particularly limited. For example, the following methods may be envisaged.

(12-1) Method 1

The cylindrical member is mounted to the cultivation bottle (or placed at a predetermined location on a mushroom bed) immediately after a scraping process. Harvesting is performed by pulling the brown beech mushroom out from the cylindrical member after going through a sprouting process and completing a growing process, and the hard tip part of the harvested brown beech mushroom is cut off at a midsection location.

(12-2) Method 2

The cylindrical member is mounted to the cultivation bottle (or placed at a predetermined location on a mushroom bed) after going through the scraping process and completing the sprouting process. Harvesting is performed by pulling the brown beech mushroom out from the cylindrical member after the growing process is complete, and the hard tip part of the harvested brown beech mushroom is cut off at a midsection location.

(12-3) Method 3

After going through the scraping process and the sprouting process, buds on the peripheral outside within the wide-mouth part are removed and the cylindrical member is then mounted to the cultivation bottle (or placed at a predetermined location on a mushroom bed) during the growing process. Harvesting is performed by pulling the brown beech mushroom out from the cylindrical member after the growing process is complete, and the hard tip part of the harvested brown beech mushroom is cut off at a midsection location.

(13) Thirteenth Aspect

A thirteenth aspect of the present application is a method for cultivation and harvest of brown beech mushrooms employing the cap for a cultivation bottle for brown beech mushrooms of any one of the third aspect to the eleventh aspect. The method includes mounting the cylindrical member at a location where a brown beech mushroom will grow from a mushroom bed and placing the bowl-shaped member on the cylindrical member, harvesting the brown beech mushroom by removing the bowl-shaped member from the cylindrical member after growth of the brown beech mushroom has ended, and cutting off a hard tip part of the harvested brown beech mushroom at a midsection location.

The "location where a brown beech mushroom will grow" refers to the wide-mouth part when employing a cultivation bottle, or any desired location where the clump is encouraged to grow when employing a box-shaped mushroom bed to grow plural clumps. By placing the cap for a cultivation bottle for brown beech mushrooms at such a location, the hard tip part of the clump can be made to grow in a state appropriately constrained by the internal diameter of the small-diameter cylindrical part. Harvesting can easily be performed simply by lifting the bowl-shaped member upward after growing. The hard tip part can easily be cut off at a midsection location, enabling the culture medium to be eliminated from the brown beech mushroom product.

Note that in the thirteenth aspect, the stage of the cultivation process at which the cap for a cultivation bottle for brown beech mushrooms is mounted is not particularly limited. For example, the following methods may be envisaged.

(13-1) Method 1

The cylindrical member is mounted to the cultivation bottle (or placed at a predetermined location on a mushroom bed) and the bowl-shaped member is mounted to the cylindrical member immediately after the scraping process.

After going through a sprouting process and completing a growing process, the brown beech mushroom is harvested by pulling the bowl-shaped member away from the cylindrical member.

Finally, the hard tip part of the harvested brown beech mushroom is cut off at a midsection location.

(13-2) Method 2

The cylindrical member is mounted to the cultivation bottle (or placed at a predetermined location on a mushroom bed) immediately after the scraping process.

After the sprouting process is complete, the bowl-shaped member is mounted to the cylindrical member.

The brown beech mushroom is then harvested by pulling the bowl-shaped member away from the cylindrical member after the growing process is complete.

Finally, the hard tip part of the harvested brown beech mushroom is cut off at a midsection location.

(13-3) Method 3

The cylindrical member is mounted to the cultivation bottle (or placed at a predetermined location on a mushroom bed) after going through the scraping process and completing the sprouting process. The bowl-shaped member is mounted to the cylindrical member.

After the growing process is complete, the brown beech mushroom is harvested by pulling the bowl-shaped member away from the cylindrical member.

Finally, the hard tip part of the harvested brown beech mushroom is cut off at a midsection location.

(13-4) Method 4

After going through the scraping process and the sprouting process, buds on the peripheral outside within the wide-mouth part are removed and the cylindrical member is then mounted to the cultivation bottle (or placed at a predetermined location on a mushroom bed) during the growing process. The bowl-shaped member is then mounted to the cylindrical member.

After the growing process is complete, the brown beech mushroom is harvested by pulling the bowl-shaped member away from the cylindrical member.

Finally, the hard tip part of the harvested brown beech mushroom is cut off at a midsection location.

Advantageous Effects of Invention

Due to the above configuration, the present invention achieves the following advantageous effects.

Namely, during the brown beech mushroom cultivation process, the hard tip part is firmed up and encouraged to grow somewhat elongated during cultivation such that the culture medium is not lifted up with the mushroom clump, thereby enabling the brown beech mushrooms to be harvested in a clump without contamination by the culture medium, and without the mushroom heads separating even when the hard tip part has been cut off. Since there is no contamination by the culture medium, the shelf life of the product is improved in comparison to hitherto. Moreover, the effort of cutting and removing the hard tip part prior to cooking food can be eliminated, thereby reducing labor and improving food sanitation.

Specifically, since the culture medium does not contaminate the cooked food, the product can be prepared and eaten with peace of mind without discarding any of the purchased product, while also eliminating the effort of cutting off the hard tip part.

Mounting the cap for a cultivation bottle for brown beech mushrooms during the sprouting process enables misshapen mushrooms caused by contact with plastic sheeting to be suppressed, as well as suppressing inundation with water and surface drying.

Moreover, the number of mushroom buds is regulated by mounting the cap for a cultivation bottle for brown beech mushrooms, such that each mushroom is good quality.

Since the culture medium does not adhere to the hard tip part, the entire product is edible, blue mold and germs arising due to dirt at the cultivation bottle opening can be suppressed, and crumbs of the culture medium can be suppressed from adhering.

Moreover, if the cap for a cultivation bottle for brown beech mushrooms is formed from a synthetic resin material, the cultivation equipment can be washed and used repeatedly, making the cultivation equipment both hygienic and economical.

The cap for a cultivation bottle for brown beech mushrooms corrects the shape of the brown beech mushrooms so as not to be deformed below the horizontal, enabling a uniform shape to be obtained.

BRIEF DESCRIPTION OF DRAWINGS AND PHOTOGRAPHS

DESCRIPTION OF EMBODIMENTS

Explanation follows regarding exemplary embodiments of the present invention, with reference to the drawings. The resin materials named below are merely examples, and other materials may be employed as appropriate.

(1) First Exemplary Embodiment (1-1) Cultivation Bottle 50

Figure 1:
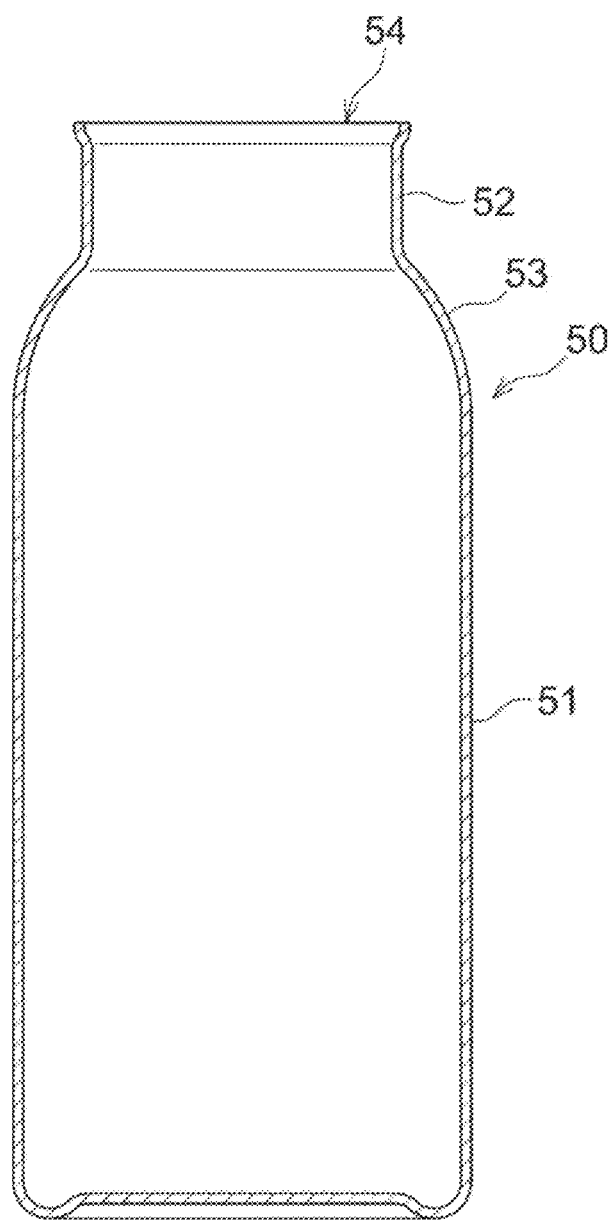
FIG. 1 is a front view cross-section of a cultivation bottle mounted with a cap for a cultivation bottle for brown beech mushrooms according to a first exemplary embodiment.
Figure 2A:
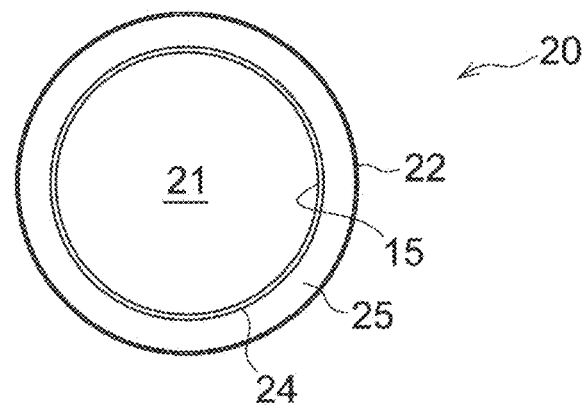
FIG. 2A is a plan view illustrating a cylindrical member of a brown beech mushroom cultivation bottle according to the first exemplary embodiment.
Figure 2B:
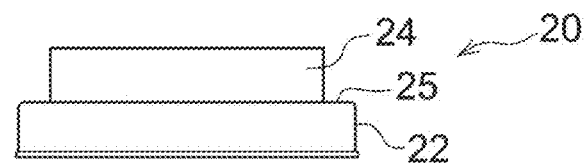
FIG. 2B is a front view illustrating a cylindrical member of a cap for a cultivation bottle for brown beech mushrooms according to the first exemplary embodiment.
Figure 2C:
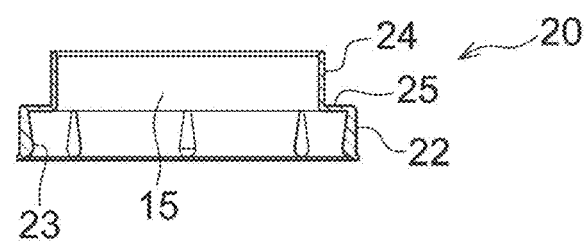
FIG. 2C is a front view cross-section illustrating a cylindrical member of a cap for a cultivation bottle for brown beech mushrooms according to the first exemplary embodiment.
Figure 2D:
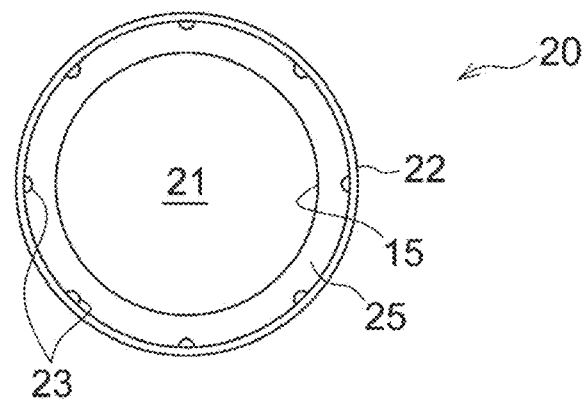
FIG. 2D is a bottom view illustrating a cylindrical member of a cap for a cultivation bottle for brown beech mushrooms according to the first exemplary embodiment.

A cultivation bottle 50 is blown from a polypropylene resin. As illustrated in FIG. 1, an upper end of a long thin body part 51 is integrally provided with a narrower circular cylindrical neck part 52 via a sloping shoulder part 53. An upper end of the neck part 52 configures a wide-mouth part 54.

(1-2) Cylindrical Member 20

As illustrated in FIG. 2A to FIG. 2D, a cylindrical member 20 of a cap for a cultivation bottle for brown beech mushrooms 10 includes a large-diameter cylindrical part 22 of a size that can be fitted tightly onto an outer periphery of the wide-mouth part 54 of the cultivation bottle 50, a connecting part 25 contacting an upper surface of the large-diameter cylindrical part 22, and a small-diameter cylindrical part 24 positioned toward the center projects upward from the connecting part 25, which are integrally formed by injection molding a polypropylene resin. The connecting part 25 connects an outer peripheral edge of the large-diameter cylindrical part 22 to an outer surface of the small-diameter cylindrical part 24.

Eight inward-projecting anchor protrusions 23 are arranged uniformly around an inner peripheral surface of the large-diameter cylindrical part 22. When the wide-mouth part 54 of the cultivation bottle 50 is pressed into the large-diameter cylindrical part 22, an upper edge of the wide-mouth part 54 abuts the anchor protrusions 23. Namely, the large-diameter cylindrical part 22 covers and is fitted to an end edge of the wide-mouth part 54 and an outer surface in the vicinity of the end edge.

The small-diameter cylindrical part 24 appropriately presses against and firms up a hard tip part 64 of brown beech mushrooms as they grow, due to an first opening 21 configuring an opening in the small-diameter cylindrical part 24. The first opening 21 should have a proportional opening size in a range of from 30% to 90% of that of the opening of the wide-mouth part 54 of the cultivation bottle 50. Moreover, the height of an inner surface 15 of the small-diameter cylindrical part 24 is from 6 mm to 30 mm. This height causes the hard tip part 64 to grow more elongated than it would normally.

Although the small-diameter cylindrical part 24 projects upward from the connecting part 25 in the present exemplary embodiment, part of the small-diameter cylindrical part 24 may project downward from the connecting part 25 as long as the height of the inner surface 15 mentioned above can be secured. Moreover, a lower end of the small-diameter cylindrical part 24 may extend downward far enough to contact the surface of a culture medium 60.

Note that the inner surface 15 of the small-diameter cylindrical part 24 may be somewhat tapered instead of vertical as illustrated in the drawings.

(1-3) Bowl-Shaped Member 30

As illustrated in FIG. 3A to FIG. 3D, in the cap for a cultivation bottle for brown beech mushrooms 10, a bowl-shaped member 30 is separate from the cylindrical member 20 and includes a short circular cylindrical outer-insertion part 35 having a second opening 31 as an opening, and a corrective part 33 rising upward from a peripheral edge of the outer-insertion part 35 in a bowl shape, which are integrally formed by injection molding a polypropylene resin. Plural outward-projecting ribs 34 are arranged uniformly around the vicinity of an upper end of an outer face of the corrective part 33. The ribs 34 are provided in order to prevent bowl-shaped members 30 from becoming stuck inside each other such that they cannot be separated when plural of the bowl-shaped members 30 are stacked in storage, to increase the stability when stacked, and to improve machine compatibility by for example performing positioning with the ribs 34 when a process to cut off the hard tip part of the clump is automated. Moreover, four semicircular notches 36 are arranged uniformly around the outer-insertion part 35.

The corrective part 33 is for neatening the shape of the brown beech mushroom clump. Since brown beech mushrooms grow by spreading sideways as they extend upward, the corrective part 33 prevents excessive outward growth so as to neaten to an appropriate shape for the product.

(1-4) Mounting of Bowl-Shaped Member 30 to Cylindrical Member 20

The bowl-shaped member 30 is mounted to the cylindrical member 20 described above to configure the cap for a cultivation bottle for brown beech mushrooms 10 illustrated in FIG. 4A to FIG. 4D.

Figure 3A:
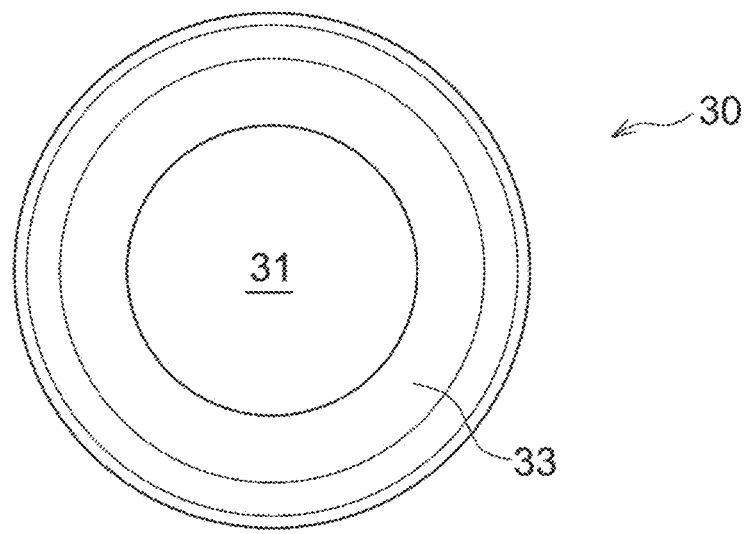
FIG. 3A is a plan view illustrating a bowl-shaped member of a cap for a cultivation bottle for brown beech mushrooms according to the first exemplary embodiment.
Figure 3B:
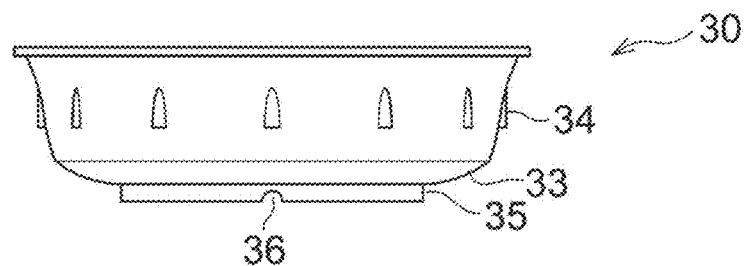
FIG. 3B is a front view illustrating a bowl-shaped member of a cap for a cultivation bottle for brown beech mushrooms according to the first exemplary embodiment.
Figure 3C:
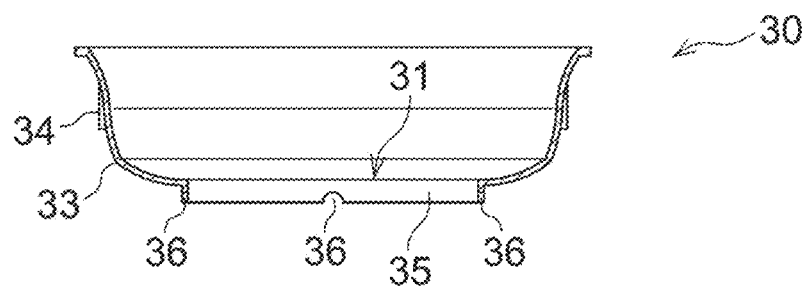
FIG. 3C is a front view cross-section illustrating a bowl-shaped member of a cap for a cultivation bottle for brown beech mushrooms according to the first exemplary embodiment.
Figure 3D:
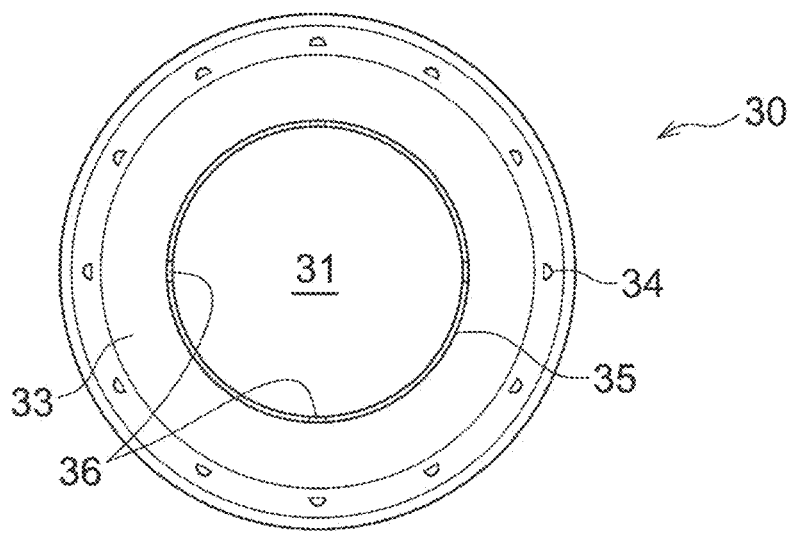
FIG. 3D is a bottom view illustrating a bowl-shaped member of a cap for a cultivation bottle for brown beech mushrooms according to the first exemplary embodiment.
Figure 4A:
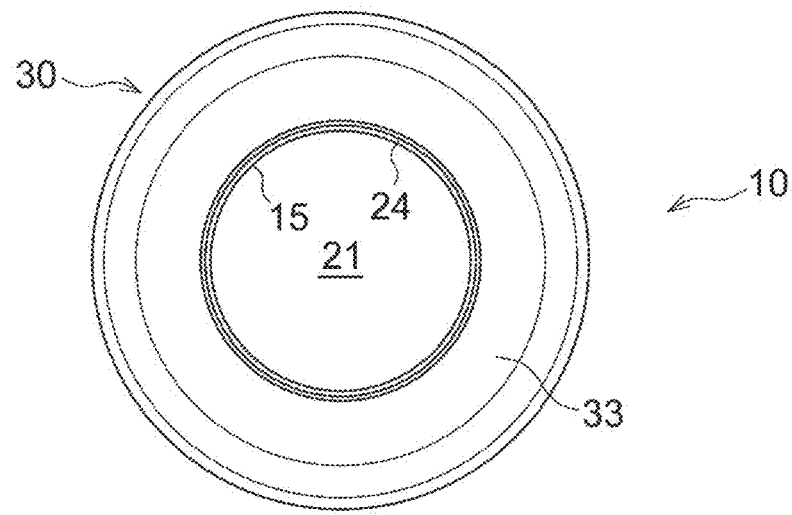
FIG. 4A is a plan view illustrating the bowl-shaped member of FIG. 3 when mounted to the cylindrical member of FIG. 2.
Figure 4B:
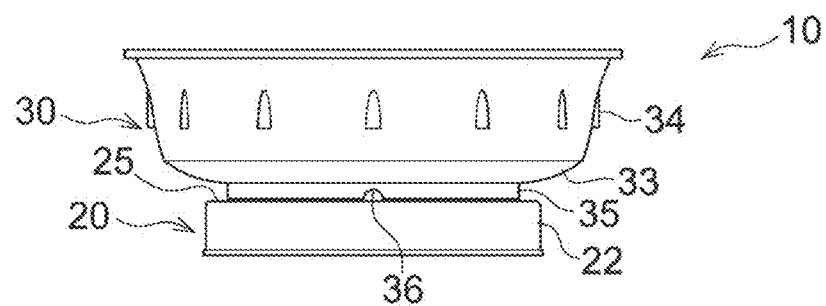
FIG. 4B is a front view illustrating the bowl-shaped member of FIG. 3 when mounted to the cylindrical member of FIG. 2.
Figure 4C:
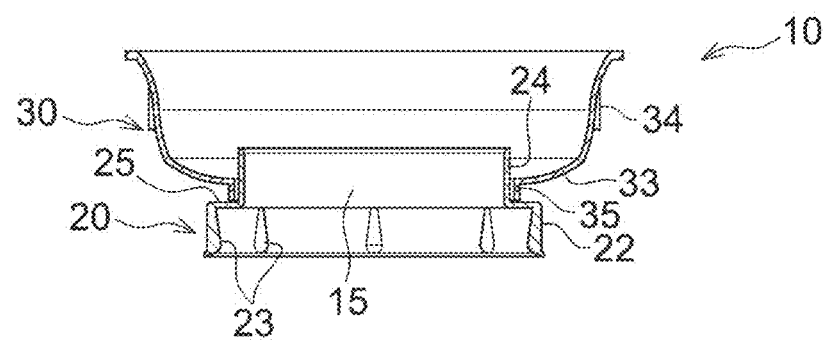
FIG. 4C is a front view cross-section illustrating the bowl-shaped member of FIG. 3 when mounted to the cylindrical member of FIG. 2.
Figure 4D:
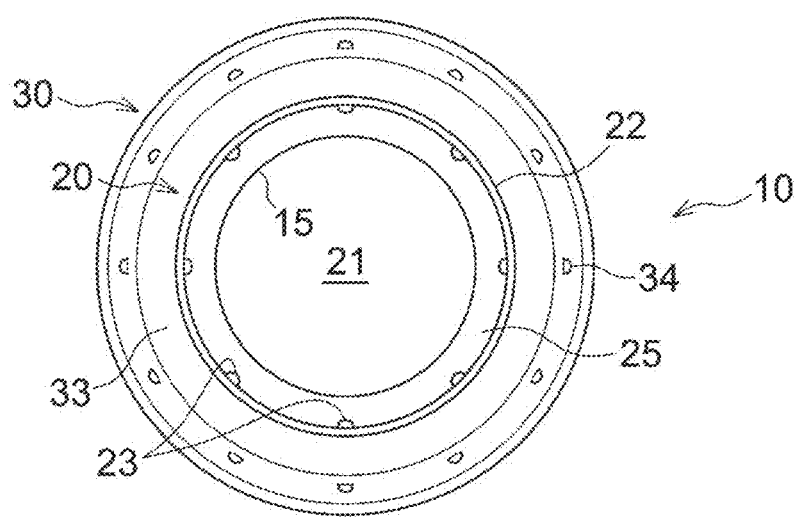
FIG. 4D is a bottom view illustrating the bowl-shaped member of FIG. 3 when mounted to the cylindrical member of FIG. 2.

The external diameter of the small-diameter cylindrical part 24 of the cylindrical member 20 has a smaller diameter than the second opening 31 of the bowl-shaped member 30 (see FIG. 3A and FIG. 3D). This enables the bowl-shaped member 30 to be placed over the cylindrical member 20 such that the outer-insertion part 35 is in a loose-fitting state at the outer side of the small-diameter cylindrical part 24. In this state, any water collecting at the bottom of the bowl-shaped member 30 during the brown beech mushroom growth process drains through the notches 36 provided in the outer-insertion part 35.

(1-5) Brown Beech Mushroom Cultivation and Harvest Method Using Cap for a Cultivation Bottle for Brown Beech Mushrooms 10

Explanation follows regarding an example of a brown beech mushroom cultivation process employing the cap for a cultivation bottle for brown beech mushrooms 10 according to the present exemplary embodiment.

(1-5-1) Mycelium Incubation Process

Figure 5:
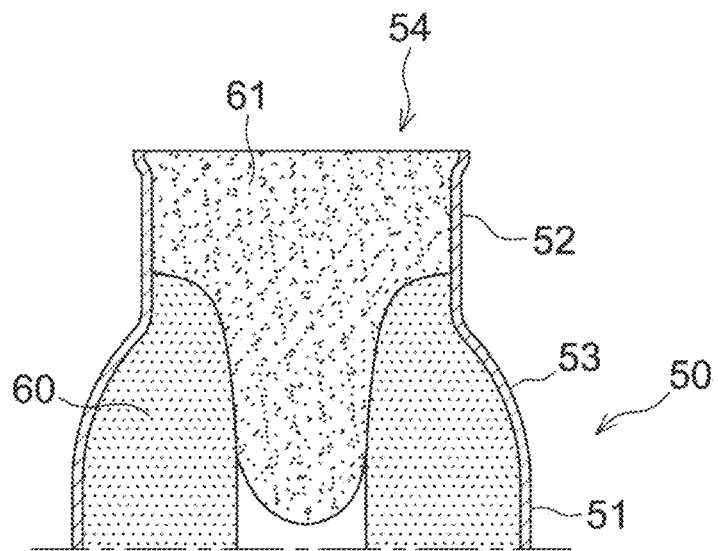
FIG. 5 illustrates a state during a mycelium incubation process of a brown beech mushroom cultivation process.

Similarly to in related brown beech mushroom cultivation, the cultivation bottle 50 is filled with the regulated culture medium 60, and once cooled after sterilization, the culture medium 60 is inoculated with a spawn 61 to form a mushroom bed (see FIG. 5). During incubation, the temperature of the incubation chamber is maintained at 20° C. to 21° C. to encourage growth of the mycelium.

(1-5-2) Scraping Process

Figure 6:
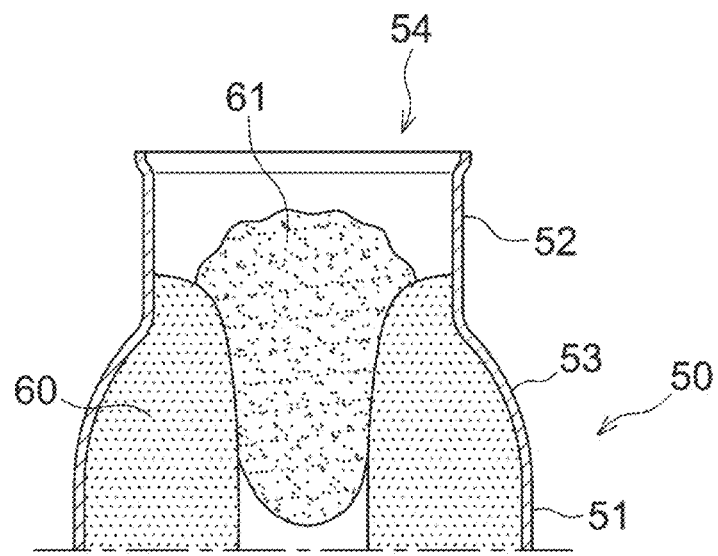
FIG. 6 illustrates a state immediately after completion of a scraping process of a brown beech mushroom cultivation process.

After the mycelium incubation process described above has ended, a scraping operation is performed in a scraping chamber (see FIG. 6). The end of the scraping operation is considered day zero of growth.

(1-5-3) Sprouting Process

On growth day zero, the cylindrical member 20 is attached to the wide-mouth part 54 of the cultivation bottle 50 (see FIG. 7), which is transferred to a sprouting chamber. In this state, the temperature is maintained at approximately 15° C. and the cultivation bottle 50 is left for approximately two weeks while illuminating with light from above as appropriate to encourage sprouting of a fruiting body primordium 62 (see FIG. 8).

(1-5-4) Growing Process

Figure 9:
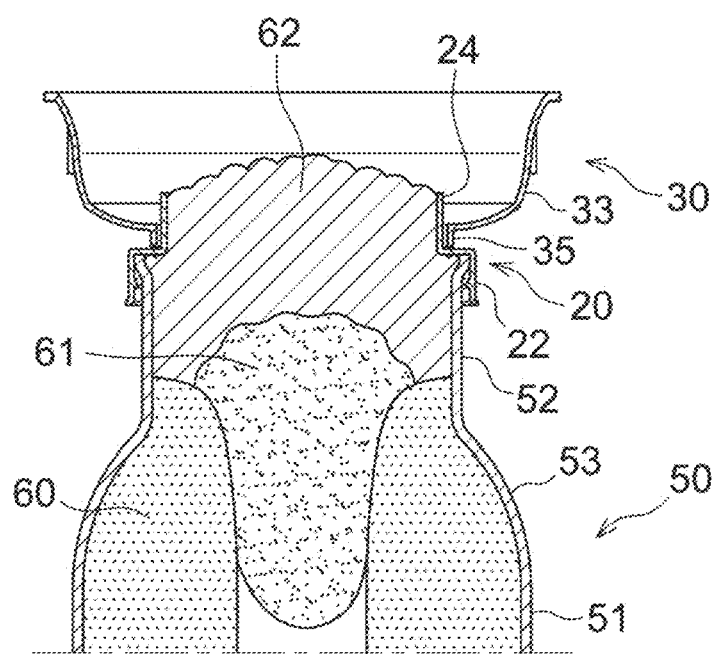
FIG. 9 illustrates a state during a growing process of a brown beech mushroom cultivation process.

After the sprouting process has ended, the bowl-shaped member 30 is mounted to the cylindrical member 20 (see FIG. 9), and transferred to a growing chamber. The temperature is maintained at approximately 15° C. and left in this state for approximately one week while being illuminated with light from above as appropriate to encourage growth of the fruiting body primordium 62. The sides of the fruiting body primordium 62 are thereby restricted by the profile of the inner surface of the corrective part 33 of the bowl-shaped member 30, such that a base part of the fruiting body primordium 62 grows into a bowl shape.

(1-5-5) Harvesting

Figure 10:
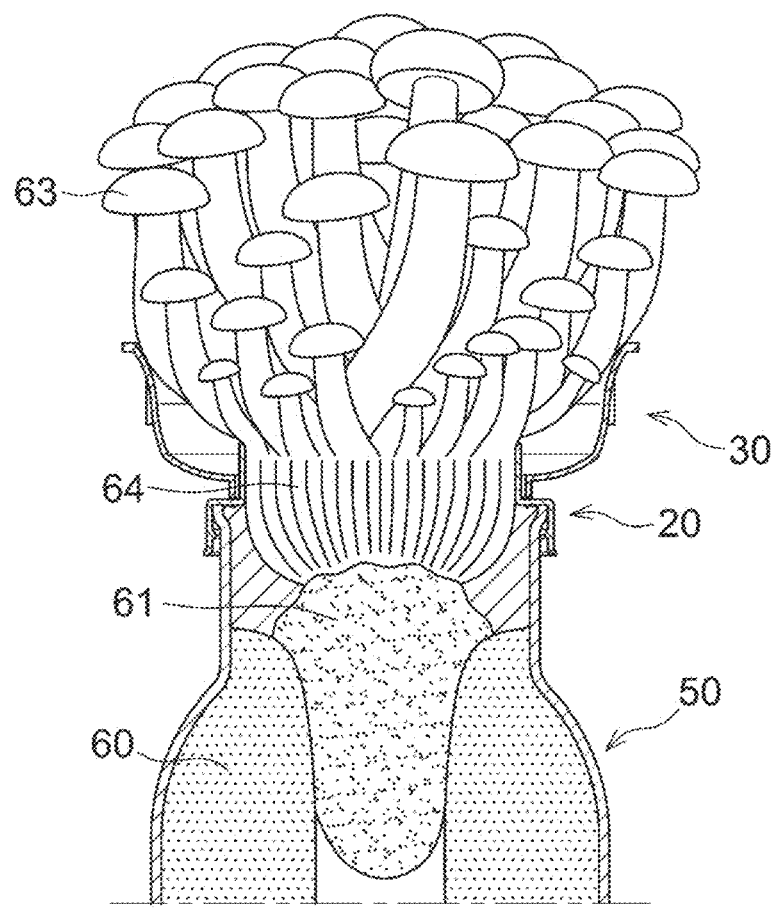
FIG. 10 illustrates a state of brown beech mushrooms immediately prior to harvest.
Figure 11:
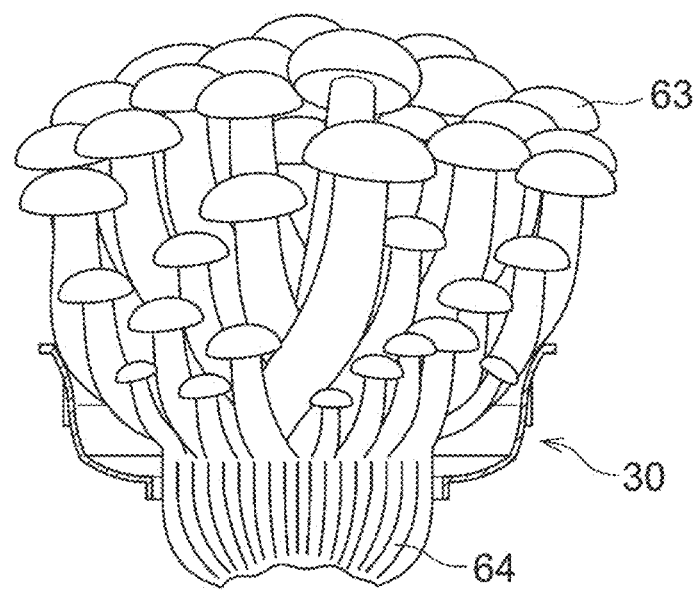
FIG. 11 illustrates a state in which brown beech mushrooms have been removed together with a bowl-shaped member from the state in FIG. 10.
Figure 12:
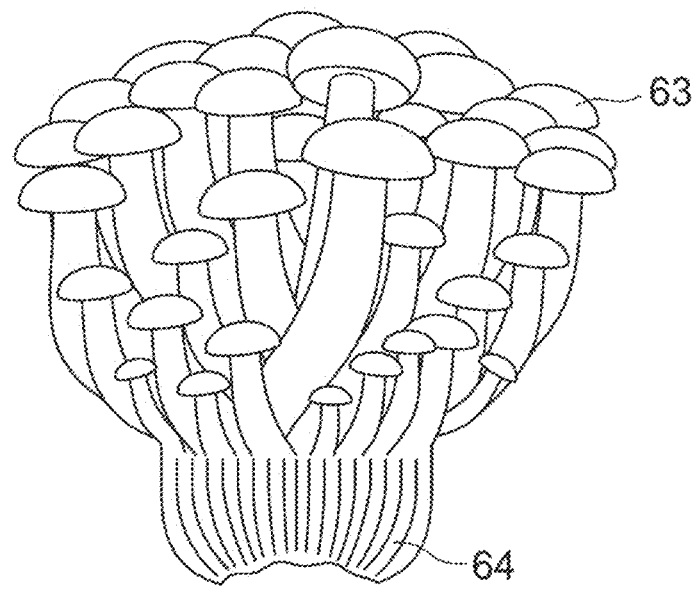
FIG. 12 illustrates a state of brown beech mushrooms after the bowl-shaped member has been removed from the state in FIG. 11.
Figure 13:
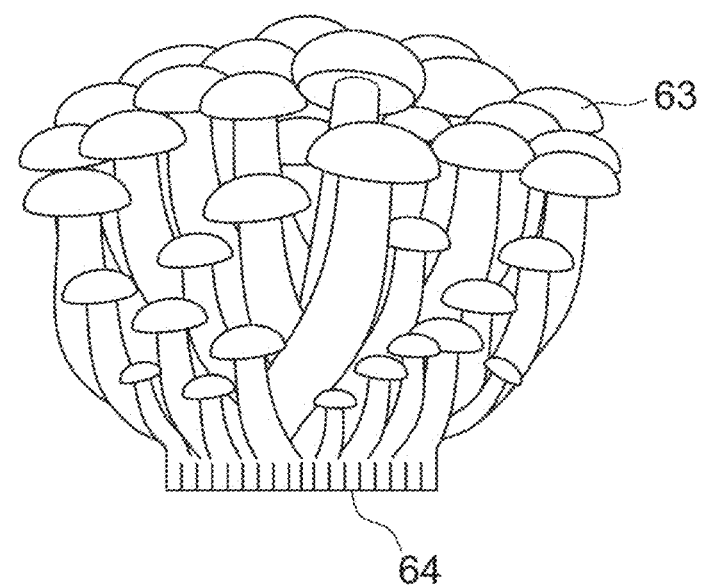
FIG. 13 illustrates a state in which a hard tip part has been cut off at a midsection location from the state in FIG. 12.

After a fruiting body 63 has grown to a predetermined size in the growing process (see FIG. 10), the cultivation bottle 50 is moved from the growing chamber. The bowl-shaped member 30 is then lifted up so as to remove the brown beech mushrooms from the culture medium 60 for harvesting (see FIG. 11). The bowl-shaped member 30 is then removed (see FIG. 12), and the hard tip part 64 is cut off at a midsection location (see FIG. 13). The part of the hard tip part 64 to which the culture medium 60 has adhered is thus removed and the base assumes a flat shape. The brown beech mushrooms are then passed to a packaging process.

(1-5-6) Modified Examples

Note that the processes explained in (1-5-1) to (1-5-5) are merely examples, and the timing at which the cap for a cultivation bottle for brown beech mushrooms 10 is mounted may be modified as appropriate.

For example, in the above processes, although the cylindrical member 20 is mounted immediately after the scraping process, the cylindrical member 20 may be mounted when the sprouting process has ended.

Moreover, the bowl-shaped member 30 may be mounted in a process following the process in which the cylindrical member 20 is mounted, or may be mounted at the same time as the cylindrical member 20 is mounted.

Figure 7:
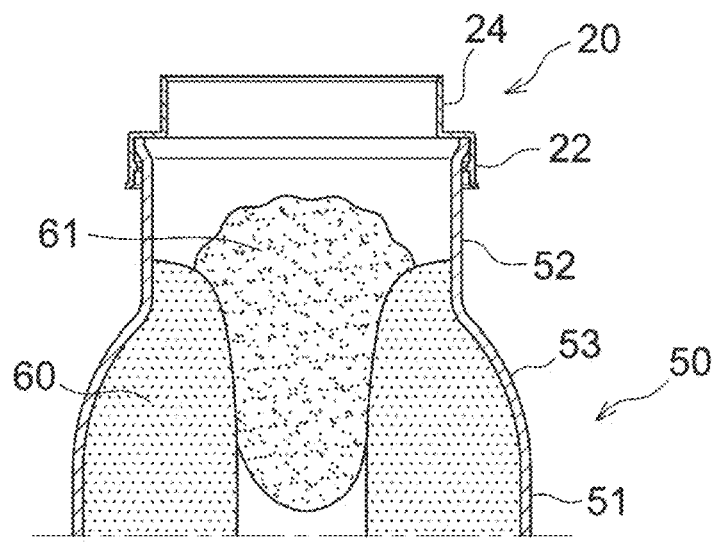
FIG. 7 illustrates a mounted state of a cylindrical member immediately after completion of a scraping process of a brown beech mushroom cultivation process.
Figure 8:
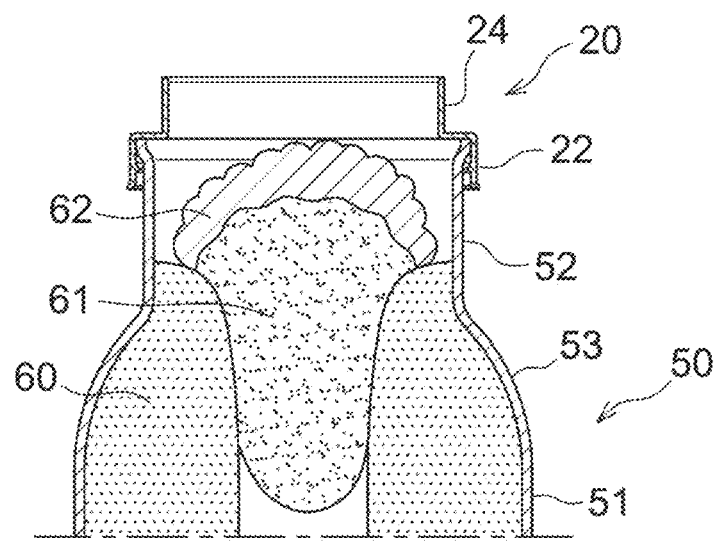
FIG. 8 illustrates a state during a sprouting process of a brown beech mushroom cultivation process.
Figure 14:
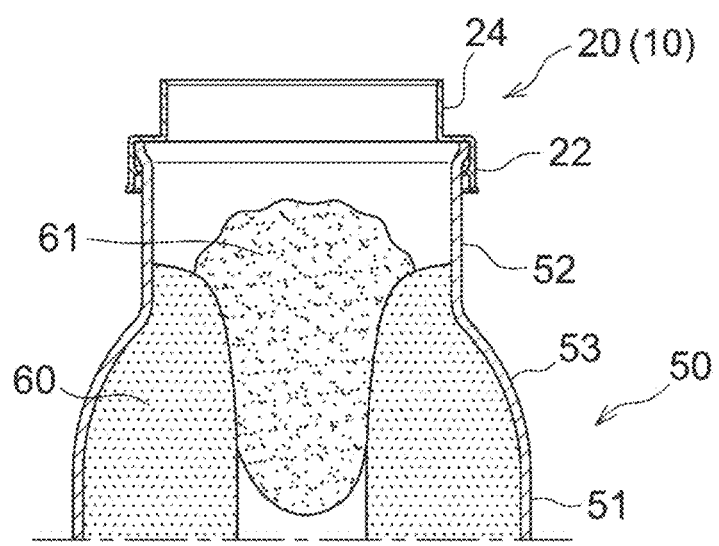
FIG. 14 is a front view cross-section illustrating a modified example of the first exemplary embodiment.
Figure 15A:
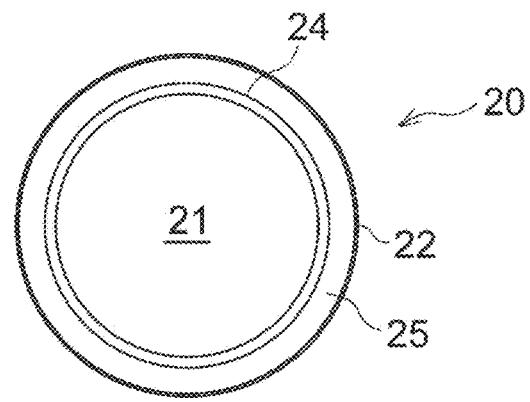
FIG. 15A is a plan view illustrating a cylindrical member of a cap for a cultivation bottle for brown beech mushrooms according to a second exemplary embodiment.
Figure 15B:
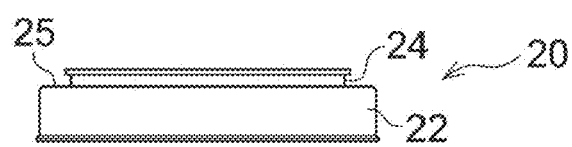
FIG. 15B is a front view illustrating a cylindrical member of a cap for a cultivation bottle for brown beech mushrooms according to the second exemplary embodiment.
Figure 15C:
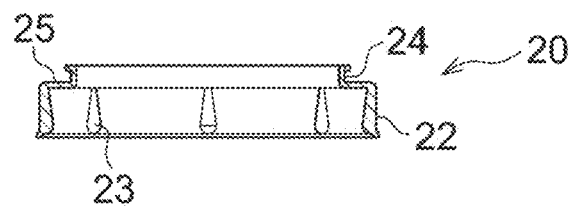
FIG. 15C is a front view cross-section illustrating a cylindrical member of a cap for a cultivation bottle for brown beech mushrooms according to the second exemplary embodiment.
Figure 15D:
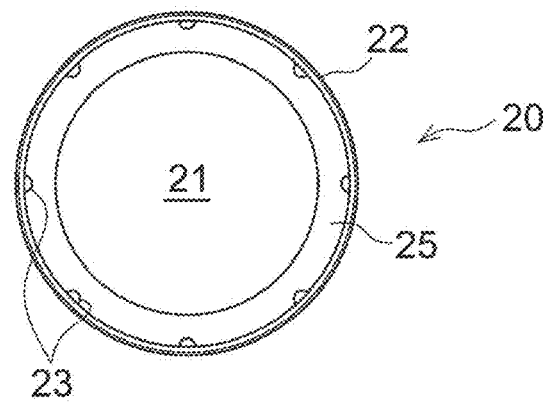
FIG. 15D is a bottom view illustrating a cylindrical member of a cap for a cultivation bottle for brown beech mushrooms according to the second exemplary embodiment.
Figure 16A:
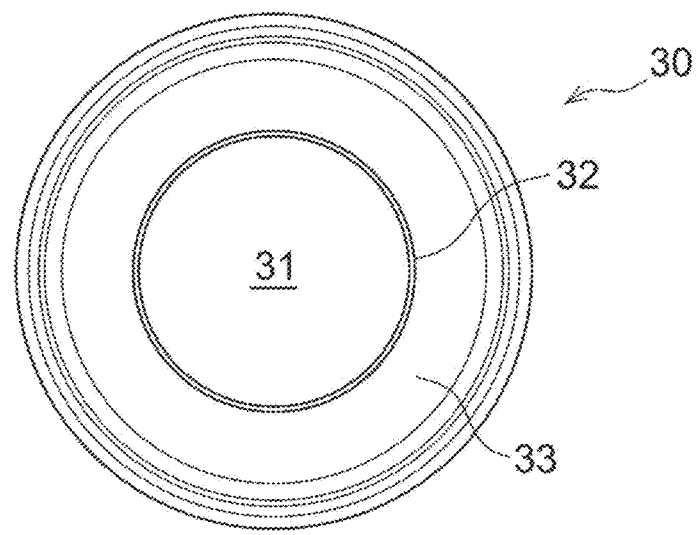
FIG. 16A is a plan view illustrating a bowl-shaped member of a cap for a cultivation bottle for brown beech mushrooms according to the second exemplary embodiment.
Figure 16B:
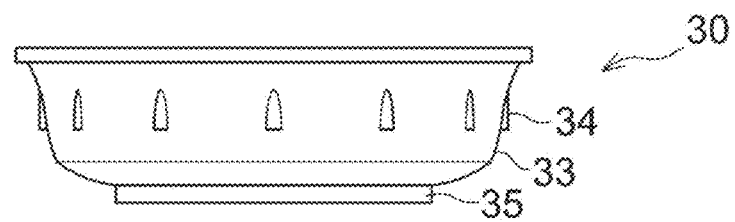
FIG. 16B is a front view illustrating a bowl-shaped member of a cap for a cultivation bottle for brown beech mushrooms according to the second exemplary embodiment.
Figure 16C:
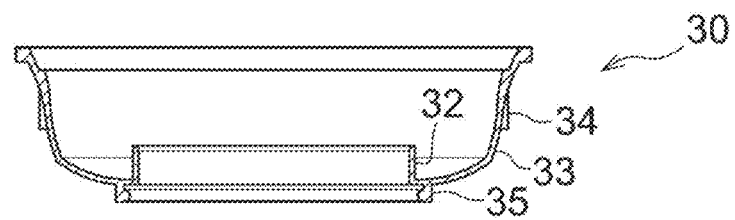
FIG. 16C is a front view cross-section illustrating a bowl-shaped member of a cap for a cultivation bottle for brown beech mushrooms according to the second exemplary embodiment.
Figure 16D:
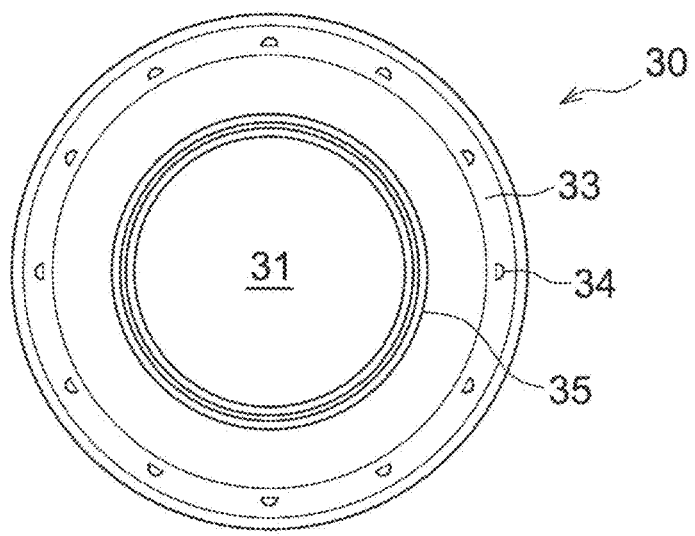
FIG. 16D is a bottom view illustrating a bowl-shaped member of a cap for a cultivation bottle for brown beech mushrooms according to the second exemplary embodiment.
Figure 17A:
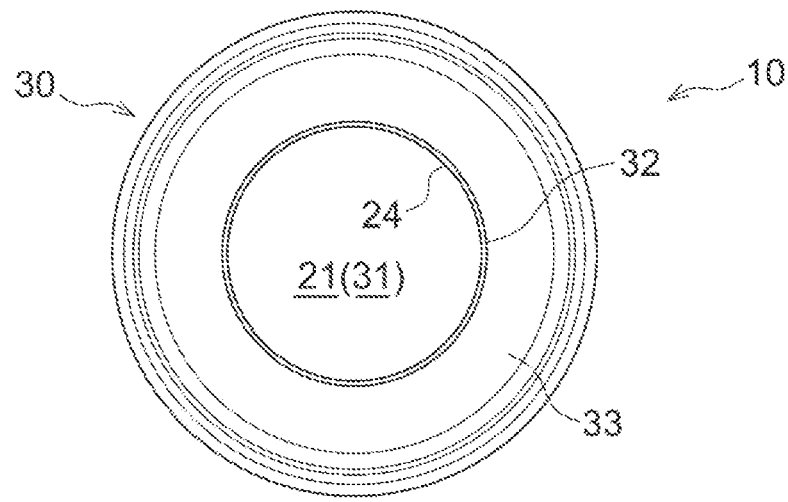
FIG. 17A is a plan view illustrating the bowl-shaped member of FIG. 16 when mounted to the cylindrical member of FIG. 15.
Figure 17B:
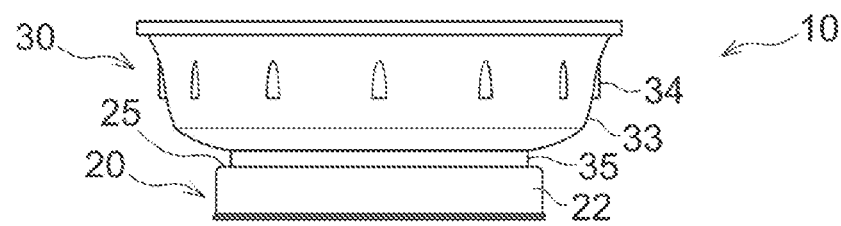
FIG. 17B is a front view illustrating the bowl-shaped member of FIG. 16 when mounted to the cylindrical member of FIG. 15.
Figure 17C:
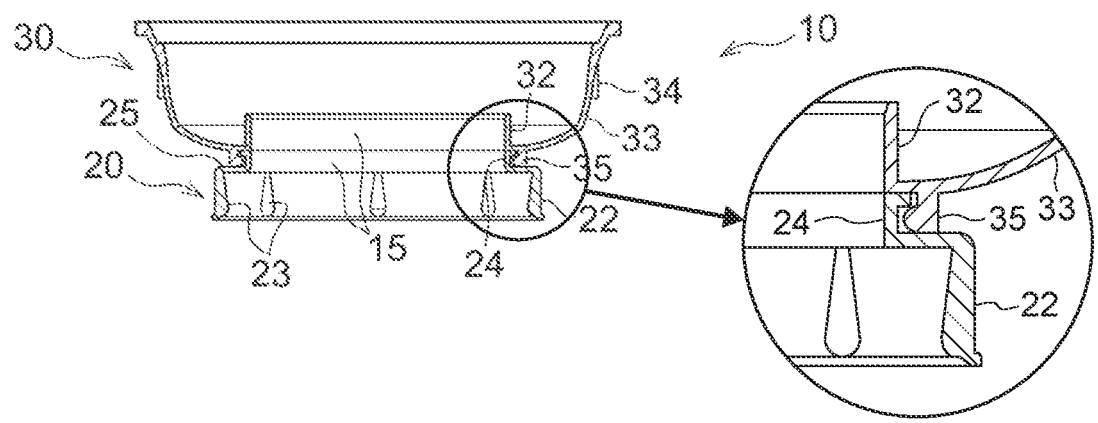
FIG. 17C is a front view cross-section including a magnified section illustrating the bowl-shaped member of FIG. 16 when mounted to the cylindrical member of FIG. 15A-15D.
Figure 17D:
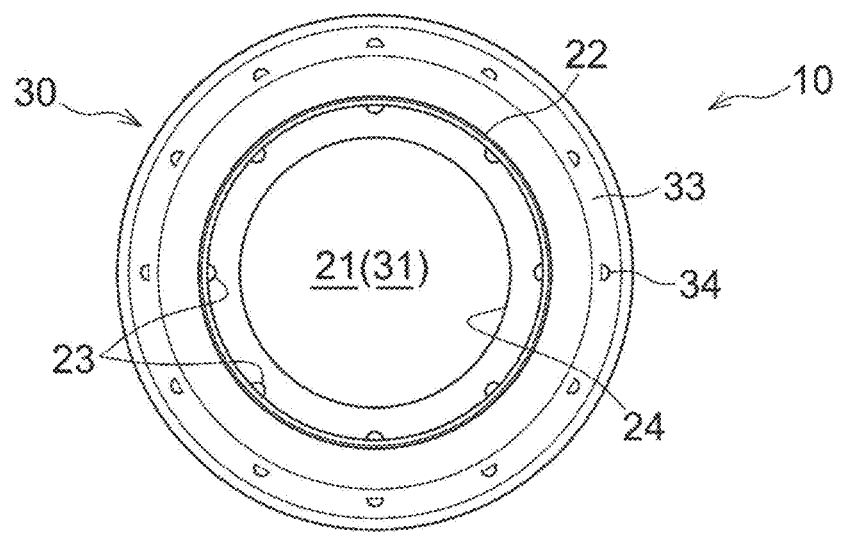
FIG. 17D is a bottom view illustrating the bowl-shaped member of FIG. 16 when mounted to the cylindrical member of FIG. 15.
Figure 18A:
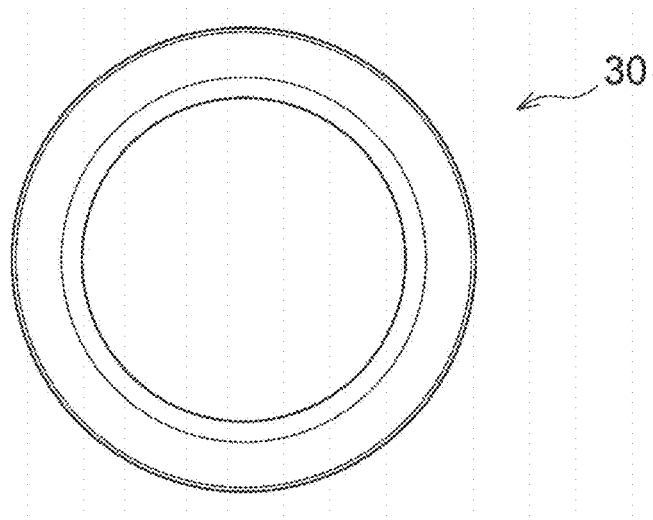
FIG. 18A is a plan view illustrating a bowl-shaped member of a cap for a cultivation bottle for brown beech mushrooms according to a third exemplary embodiment.
Figure 18B:
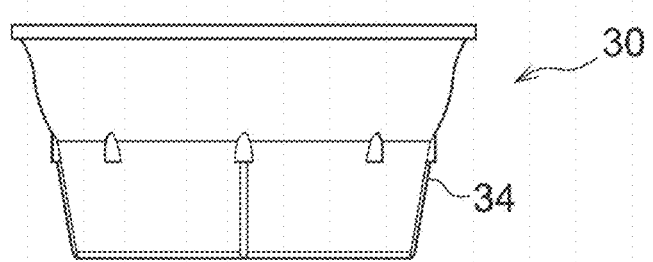
FIG. 18B is a front view illustrating a bowl-shaped member of a cap for a cultivation bottle for brown beech mushrooms according to the third exemplary embodiment.
Figure 18C:
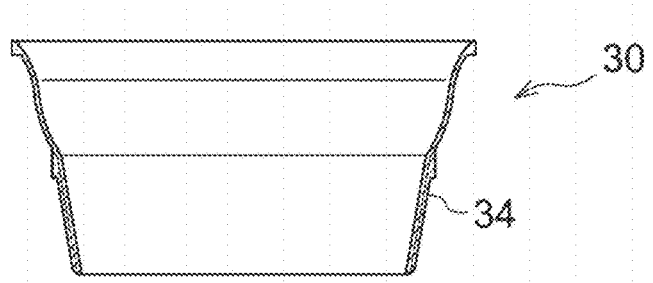
FIG. 18C is a front view cross-section illustrating a bowl-shaped member of a cap for a cultivation bottle for brown beech mushrooms according to the third exemplary embodiment.
Figure 18D:
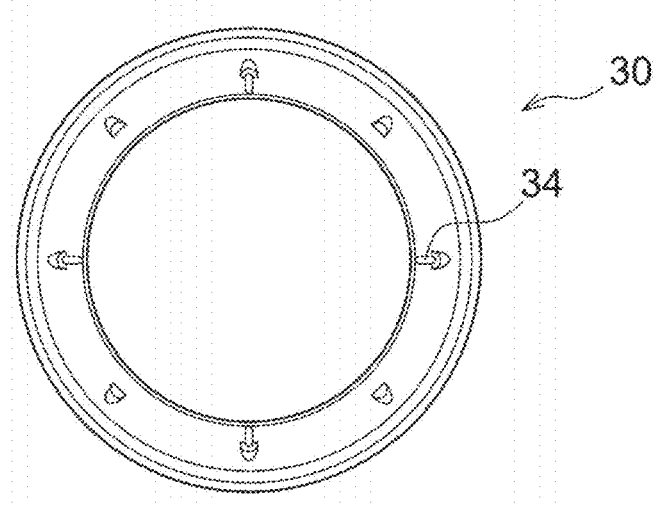
FIG. 18D is a bottom view illustrating a bowl-shaped member of a cap for a cultivation bottle for brown beech mushrooms according to the third exemplary embodiment.

Alternatively, the brown beech mushrooms may be grown in the state illustrated in FIG. 7 until harvesting without mounting the bowl-shaped member 30. In such cases, the cap for a cultivation bottle for brown beech mushrooms 10 is configured by the cylindrical member 20 alone (see FIG. 14). In such cases, the brown beech mushrooms may be directly grasped by hand when being removed from the culture medium 60 during harvesting.

Although the cap for a cultivation bottle for brown beech mushrooms 10 is mounted to the cultivation bottle 50 in the above processes, there is no limitation thereto, and the cap for a cultivation bottle for brown beech mushrooms 10 may be applied to a box shaped mushroom bed with a surface area allowing the growth of plural clumps. In such cases, after scraping locations where the brown beech mushrooms are intended to be grown as in (1-5-2) above, cylindrical member 20 may be placed on these locations, with subsequent processing performed similarly to in (1-5-3) onward.

(2) Second Exemplary Embodiment (2-1) Cultivation Bottle 50

The cultivation bottle 50 is similar to that described in (1-1).

(2-2) Cylindrical Member 20

As illustrated in FIG. 15A to FIG. 15D, the cylindrical member 20 of the cap for a cultivation bottle for brown beech mushrooms 10 includes the large-diameter cylindrical part 22 of a size that can be fitted tightly onto an outer periphery of the wide-mouth part 54 of the cultivation bottle 50, the connecting part 25 contacting an upper surface of the large-diameter cylindrical part 22, and the small-diameter cylindrical part 24 positioned at the center and projecting upward from the connecting part 25, which are integrally formed by injection molding a polypropylene resin. The connecting part 25 connects an outer peripheral edge of the large-diameter cylindrical part 22 to an outer surface of the small-diameter cylindrical part 24.

Eight inward-projecting anchor protrusions 23 are arranged uniformly around an inner peripheral surface of the large-diameter cylindrical part 22. When the wide-mouth part 54 of the cultivation bottle 50 is pressed into the large-diameter cylindrical part 22, the upper edge of the wide-mouth part 54 abuts the anchor protrusions 23. Namely, the large-diameter cylindrical part 22 covers and is fitted to the end edge of the wide-mouth part 54 and an outer surface in the vicinity of the end edge.

The small-diameter cylindrical part 24 appropriately presses against and firms up the hard tip part 64 of brown beech mushrooms as they grow due to the first opening 21 configuring the opening of the small-diameter cylindrical part 24. The first opening 21 should have a proportional opening size in a range of from 30% to 90% of that of the opening of the wide-mouth part 54 of the cultivation bottle 50.

(2-3) Bowl-Shaped Member 30

As illustrated in FIG. 16A to FIG. 16D, in the cap for a cultivation bottle for brown beech mushrooms 10, the bowl-shaped member 30 is separate from the cylindrical member 20 and includes a short circular cylindrical upper cylindrical part 32 including the second opening 31 as an opening, the short circular cylindrical outer-insertion part 35 configured to be inserted around an upper end outer periphery of the small-diameter cylindrical part 24 of the cylindrical member 20, and the corrective part 33 rising upward from a peripheral edge of the second opening 31 in a bowl shape, which are integrally formed by injection molding a polypropylene resin. Plural outward-projecting ribs 34 are arranged uniformly around the vicinity of an upper end of the outer face of the corrective part 33. The ribs 34 are provided in order to prevent bowl-shaped members 30 from becoming stuck inside each other such that they cannot be separated when plural of the bowl-shaped members 30 are stacked in storage, to increase the stability when stacked, and to improve machine compatibility by for example performing positioning with the ribs 34 when a process to cut off the hard tip part of the clump is automated.

The corrective part 33 is for neatening the shape of the brown beech mushroom clump. Since brown beech mushrooms grow by spreading sideways as they extend upward, the corrective part 33 prevents excessive outward growth so as to neaten to an appropriate shape for the product.

(2-4) Mounting of Bowl-Shaped Member 30 to Cylindrical Member 20

The bowl-shaped member 30 is mounted to the cylindrical member 20 described above to configure the cap for a cultivation bottle for brown beech mushrooms 10 illustrated in FIG. 17A to FIG. 17D.

The second opening 31 configuring the opening in the upper cylindrical part 32 of the bowl-shaped member 30 has substantially the same diameter as the first opening 21 configuring the opening in the small-diameter cylindrical part 24 of the cylindrical member 20. The outer-insertion part 35 has an internal diameter slightly larger than the external diameter of the small-diameter cylindrical part 24. This enables the bowl-shaped member 30 to be placed over the cylindrical member 20 such that the outer-insertion part 35 is mounted at the outer side of an upper end edge of the small-diameter cylindrical part 24.

In the present exemplary embodiment, the inner surface 15 continues from the small-diameter cylindrical part 24 of the cylindrical member 20 to the upper cylindrical part 32 of the bowl-shaped member 30, and has a total height of from 6 mm to 30 mm. This total height causes the hard tip part 64 to grow more elongated than it would normally.

Brown beech mushroom cultivation and harvesting can be performed similarly to in (1-5) above using the cap for a cultivation bottle for brown beech mushrooms 10 according to the present exemplary embodiment.

(3) Third Exemplary Embodiment (3-1) Cultivation Bottle 50

The cultivation bottle 50 is similar to that described in (1-1).

(3-2) Cylindrical Member 20

The cylindrical member 20 of the cap for a cultivation bottle for brown beech mushrooms 10 is similar to that described in (1-2).

(3-3) Bowl-Shaped Member 30

In the cap for a cultivation bottle for brown beech mushrooms 10, the bowl-shaped member 30 is separate to the cylindrical member 20 and has a truncated substantially circular conical shape that spreads on progression upward, as illustrated in FIG. 18A to FIG. 18D. Four reinforcement ribs 34 are arranged uniformly around the outer periphery thereof.

(3-4) Mounting of Bowl-Shaped Member 30 to Cultivation Bottle 50

Figure 19:
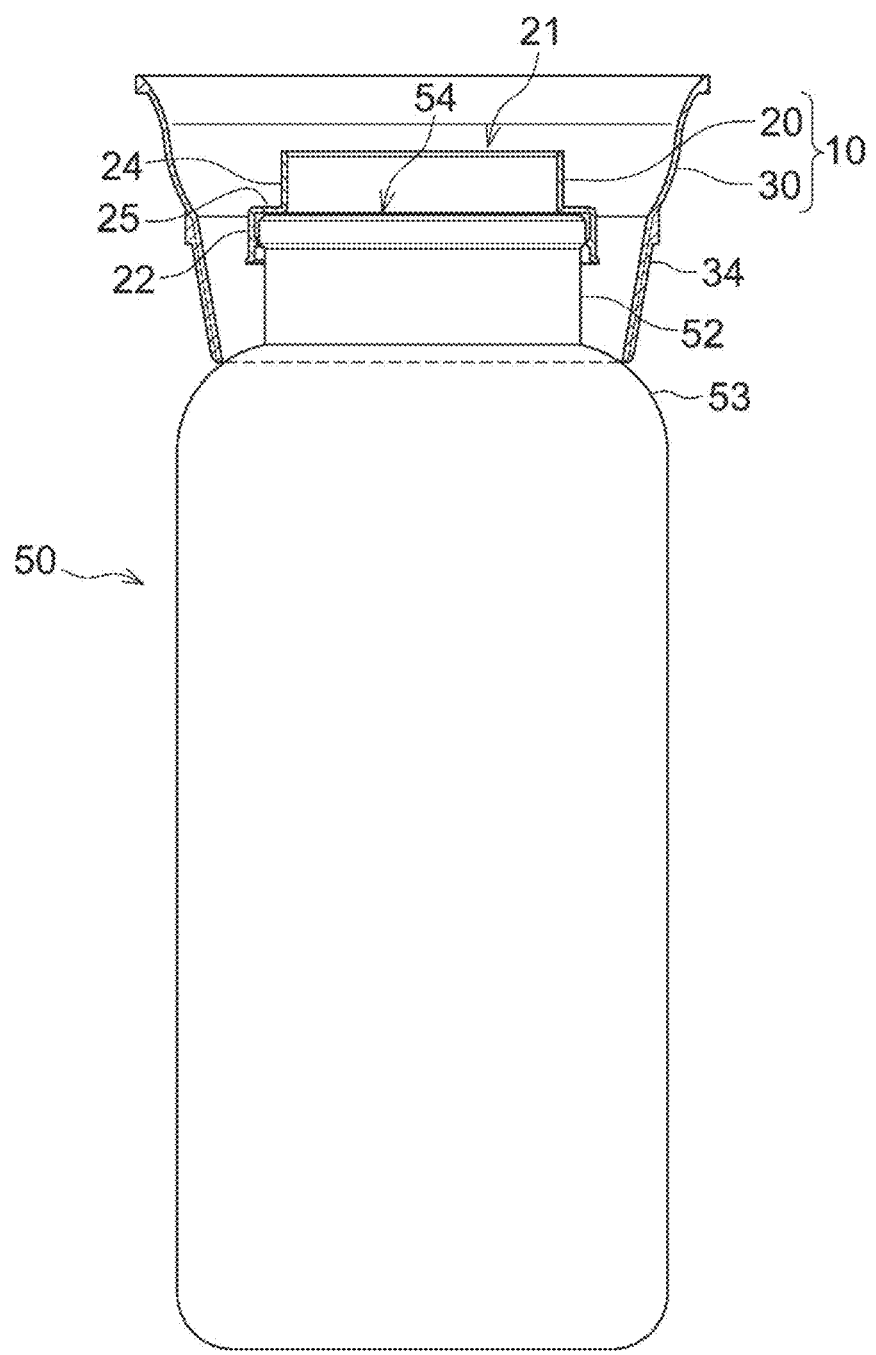
FIG. 19 is a partial front view cross-section illustrating a cap for a cultivation bottle for brown beech mushrooms according to the third exemplary embodiment when mounted to a cultivation bottle.

As illustrated in FIG. 19, the bowl-shaped member 30 is mounted in a state placed on the shoulder part 53 of the cultivation bottle 50. Namely, in the cap for a cultivation bottle for brown beech mushrooms 10 according to the present exemplary embodiment, the cylindrical member 20 and the bowl-shaped member 30 do not contact each other directly. However, a similar cultivation process to that described in (1-5) may be adopted.

(4) Fourth Exemplary Embodiment (4-1) Cultivation Bottle 50

The cultivation bottle 50 is similar to that described in (1-1).

(4-2) Cylindrical Member 20

The cylindrical member 20 of the cap for a cultivation bottle for brown beech mushrooms 10 is similar to that described in (1-2).

(4-3) Bowl-Shaped Member 30

As illustrated in FIG. 26A to FIG. 26D, in the cap for a cultivation bottle for brown beech mushrooms 10, the bowl-shaped member 30 is separate to the cylindrical member 20, has a short circular cylindrical shape, and includes the outer-insertion part 35 with an upper end provided with a placement part 38 configuring an annular flat surface including the second opening 31 as an opening, and the corrective part 33 rising upward in a bowl shape from a peripheral edge of the placement part 38, which are integrally formed by injection molding a polypropylene resin.

The corrective part 33 is for neatening the shape of the brown beech mushroom clump. Since brown beech mushrooms grow by spreading sideways as they extend upward, the corrective part 33 prevents excessive outward growth so as to neaten to an appropriate shape for the product.

(4-4) Mounting of Bowl-Shaped Member 30 to Cylindrical Member 20

The bowl-shaped member 30 is mounted to the cylindrical member 20 to configure the cap for a cultivation bottle for brown beech mushrooms 10 as illustrated in FIG. 27A to FIG. 27D.

Figure 27A:
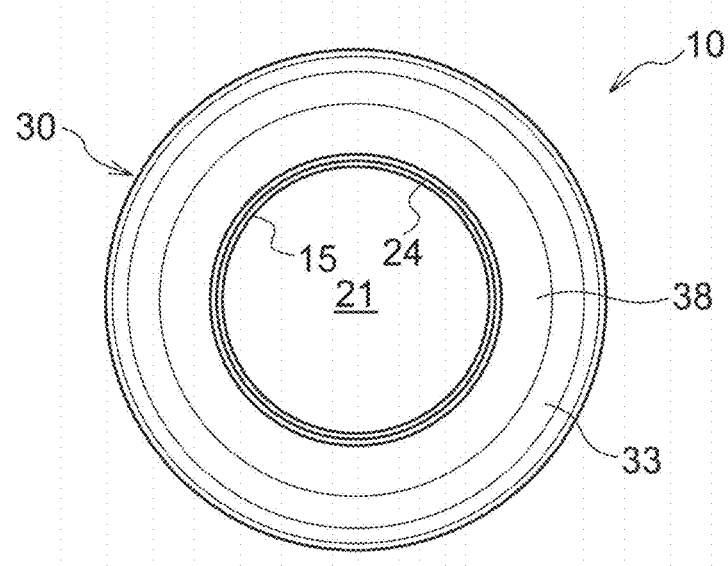
FIG. 27A is a plan view illustrating the bowl-shaped member of FIG. 26 when mounted to a cylindrical member.
Figure 27B:
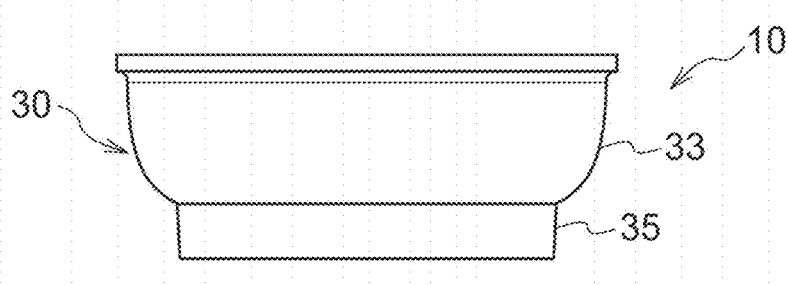
FIG. 27B is a front view illustrating the bowl-shaped member of FIG. 26 when mounted to a cylindrical member.
Figure 27C:
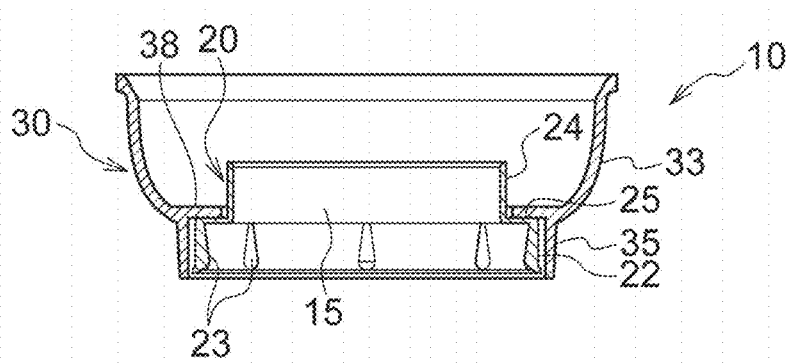
FIG. 27C is a front view cross-section illustrating the bowl-shaped member of FIG. 26 when mounted to a cylindrical member.
Figure 27D:
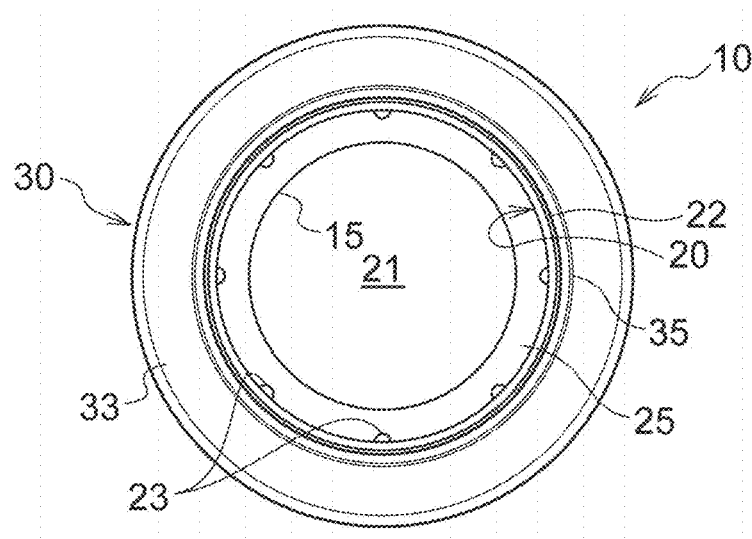
FIG. 27D is a bottom view illustrating the bowl-shaped member of FIG. 26 when mounted to a cylindrical member.

The external diameter of the small-diameter cylindrical part 24 of the cylindrical member 20 has a smaller diameter than the second opening 31 in the bowl-shaped member 30 (see FIG. 27A and FIG. 27D). The bowl-shaped member 30 can thereby be placed on the cylindrical member 20 in a state in which the small-diameter cylindrical part 24 is fitted loosely into the second opening 31 and the placement part 38 sits on the connecting part 25. In this state, the outer-insertion part 35 is inserted around the large-diameter cylindrical part 22 as illustrated in FIG. 27C.

Brown beech mushroom cultivation and harvesting can be performed similarly to in (1-5) above using the cap for a cultivation bottle for brown beech mushrooms 10 according to the present exemplary embodiment.

Figure 28A:
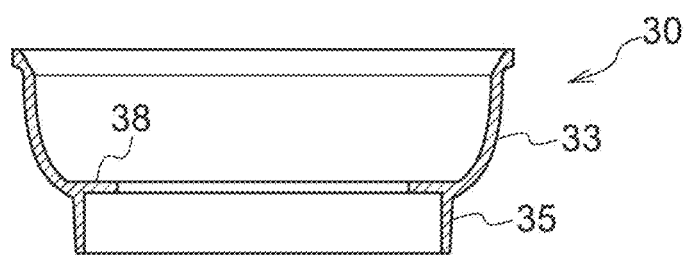
FIG. 28A is a front view cross-section illustrating the bowl-shaped members of FIG. 26 prior to stacking.
Figure 28A:
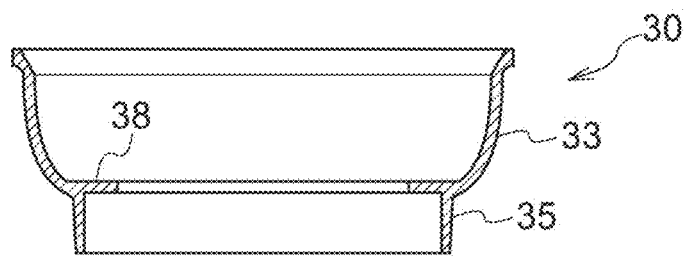
Figure 28B:
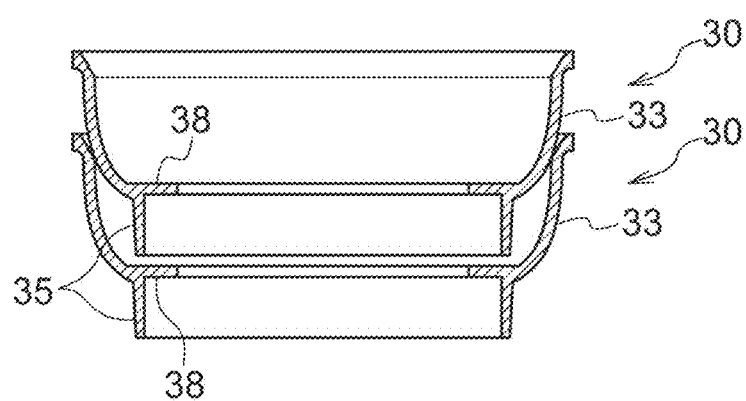
FIG. 28B is a front view cross-section illustrating the bowl-shaped members of FIG. 26 after stacking.

Note that as illustrated in FIG. 28A and FIG. 28B, bowl-shaped members 30 according to the present exemplary embodiment may be stacked one above the other such that the outer-insertion part 35 of one bowl-shaped member 30 is inserted into the corrective part 33 of another bowl-shaped member 30.

(5) Fifth Exemplary Embodiment (5-1) Cultivation Bottle 50

The cultivation bottle 50 is similar to that described in (1-1).

(5-2) Cylindrical Member 20

The cylindrical member 20 of the cap for a cultivation bottle for brown beech mushrooms 10 is similar to that described in (1-2).

(5-3) Bowl-Shaped Member 30

As illustrated in FIG. 29A to FIG. 29D, in the cap for a cultivation bottle for brown beech mushrooms 10, the bowl-shaped member 30 is separate to the cylindrical member 20 and includes the short circular cylindrical outer-insertion part 35 including the second opening 31 as an opening, the corrective part 33 rising upward in a bowl shape from the peripheral edge of the outer-insertion part 35, and a cylindrical corrective cylinder 37 projecting upward from an upper end edge of the corrective part 33, which are integrally formed by injection molding a polypropylene resin. A flange-shaped rib 34 is provided projecting outward from the vicinity of a lower end of an outer peripheral surface of the corrective cylinder 37. The rib 34 is provided in order to prevent bowl-shaped members 30 from becoming stuck inside each other such that they cannot be separated when plural of the bowl-shaped members 30 are stacked in storage, to increase the stability when stacked, and to improve machine compatibility by for example performing positioning with the rib 34 when a process to cut off the hard tip part of the clump is automated. Moreover, two semicircular notches 36 are arranged uniformly around the outer-insertion part 35.

The corrective part 33 and the corrective cylinder 37 are for neatening the shape of the brown beech mushroom clump. Since brown beech mushrooms grow by spreading sideways as they extend upward, the corrective part 33 and the corrective cylinder 37 prevent excessive outward growth so as to neaten to an appropriate shape for the product.

(5-4) Mounting of Bowl-Shaped Member 30 to Cylindrical Member 20

The bowl-shaped member 30 is mounted to the cylindrical member 20 to configure the cap for a cultivation bottle for brown beech mushrooms 10 illustrated in FIG. 30A to FIG. 30D.

Figure 29A:
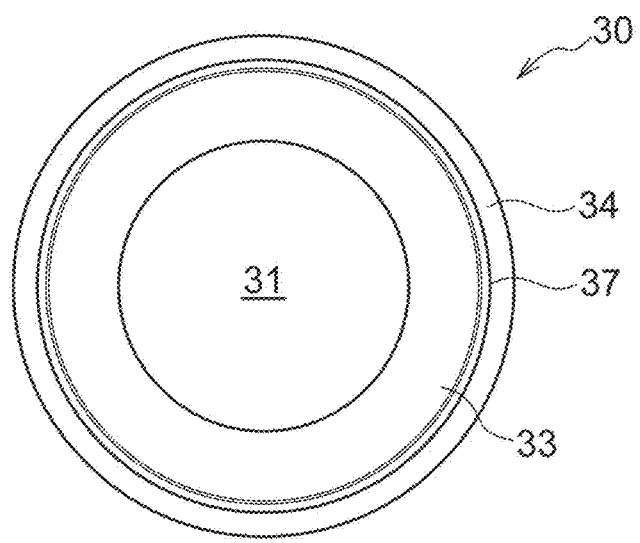
FIG. 29A is a plan view illustrating a bowl-shaped member of a cap for a cultivation bottle for brown beech mushrooms according to a fifth exemplary embodiment.
Figure 29B:
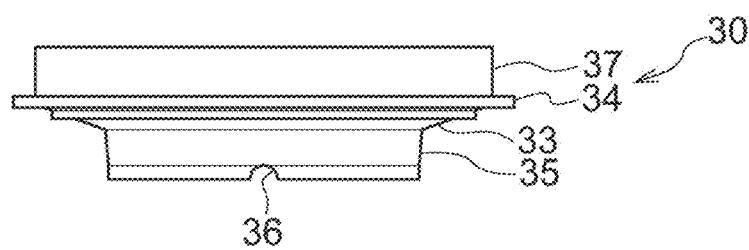
FIG. 29B is a front view illustrating a bowl-shaped member of a cap for a cultivation bottle for brown beech mushrooms according to the fifth exemplary embodiment.
Figure 29C:
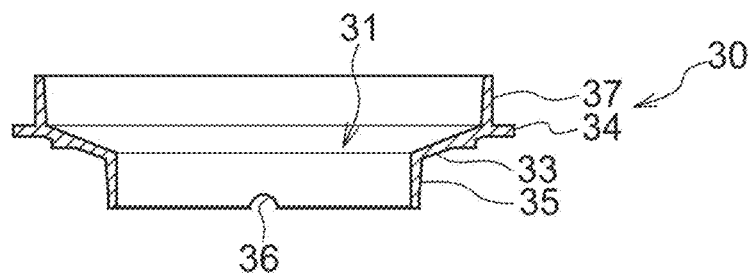
FIG. 29C is a front view cross-section illustrating a bowl-shaped member of a cap for a cultivation bottle for brown beech mushrooms according to the fifth exemplary embodiment.
Figure 29D:
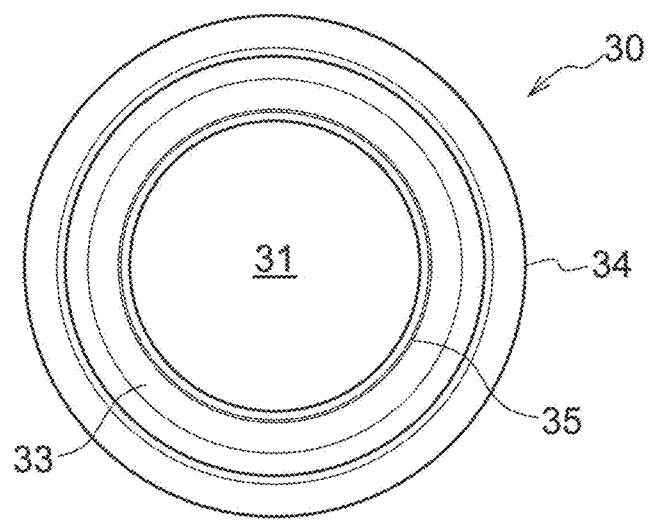
FIG. 29D is a bottom view illustrating a bowl-shaped member of a cap for a cultivation bottle for brown beech mushrooms according to the fifth exemplary embodiment.
Figure 30A:
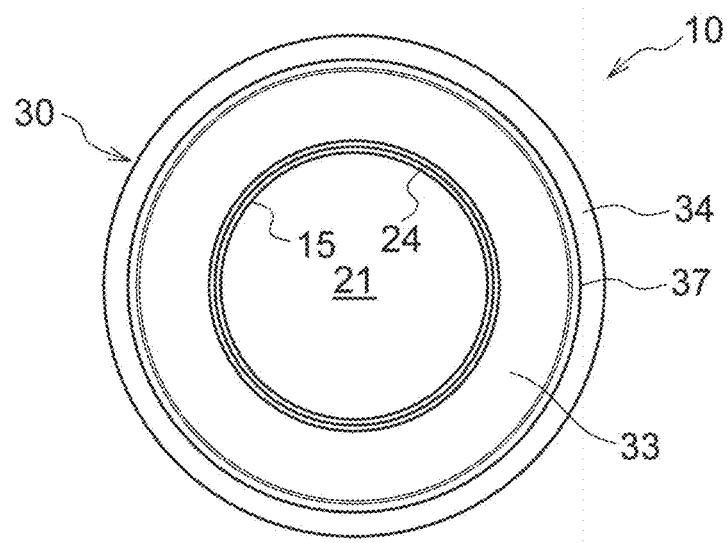
FIG. 30A is a plan view illustrating the bowl-shaped member of FIG. 29 when mounted to a cylindrical member.
Figure 30B:
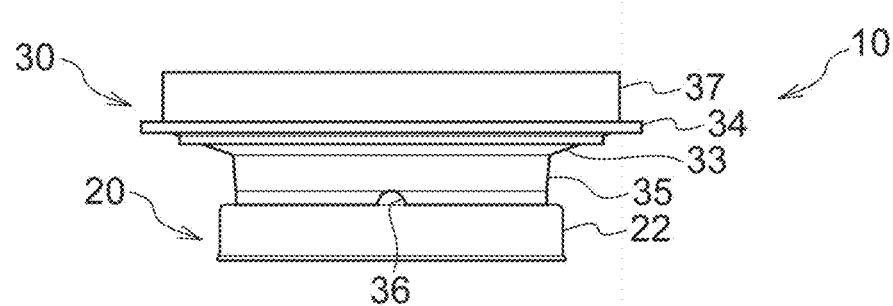
FIG. 30B is a front view illustrating the bowl-shaped member of FIG. 29 when mounted to a cylindrical member.
Figure 30C:
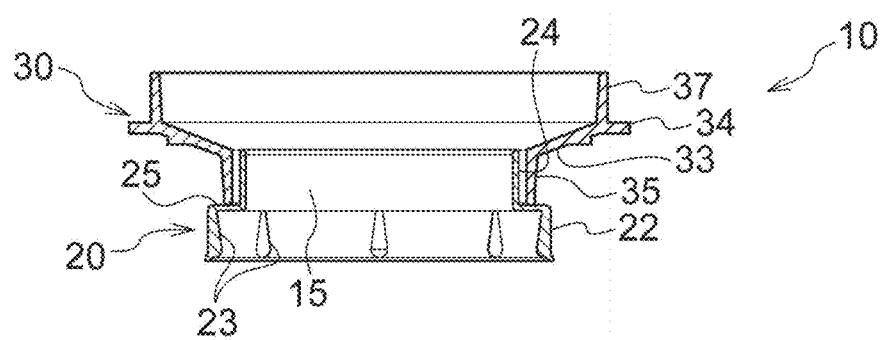
FIG. 30C is a front view cross-section illustrating the bowl-shaped member of FIG. 29 when mounted to a cylindrical member.
Figure 30D:
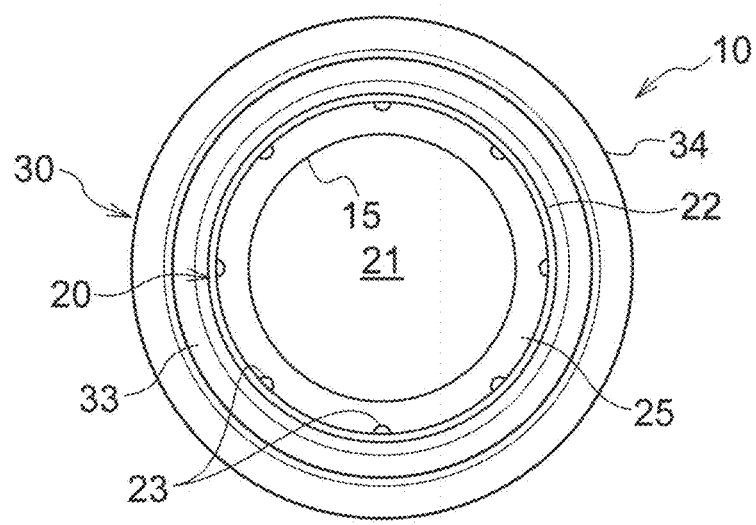
FIG. 30D is a bottom view illustrating the bowl-shaped member of FIG. 29 when mounted to a cylindrical member.

The external diameter of the small-diameter cylindrical part 24 of the cylindrical member 20 has a smaller diameter than the second opening 31 in the bowl-shaped member 30 (see FIG. 29A and FIG. 29D). This enables the bowl-shaped member 30 to be placed over the cylindrical member 20 such that the outer-insertion part 35 is in a loose-fitting state at the outer side of the small-diameter cylindrical part 24. In this state, any water collecting in the bottom of the bowl-shaped member 30 during the brown beech mushroom growth process drains through the notches 36 provided in the outer-insertion part 35.

Brown beech mushroom cultivation and harvesting can be performed similarly to in (1-5) above using the cap for a cultivation bottle for brown beech mushrooms 10 according to the present exemplary embodiment.

Figure 31A:
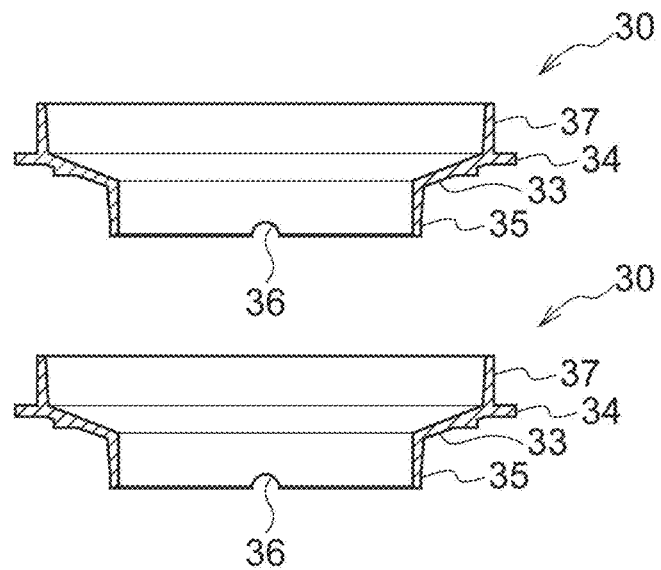
FIG. 31A is a front view cross-section illustrating the bowl-shaped members of FIG. 29 prior to stacking.
Figure 31B:
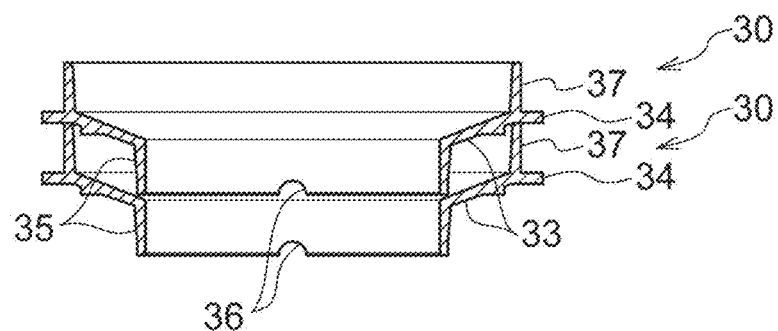
FIG. 31B is a flowchart illustrating the bowl-shaped members of FIG. 29 after stacking.

Moreover, as illustrated in FIG. 31A and FIG. 31B, bowl-shaped members 30 according to the present exemplary embodiment may be stacked one above the other such that the rib 34 of one bowl-shaped member 30 sits on the corrective cylinder 37 of another bowl-shaped member 30. This prevents the bowl-shaped members 30 from becoming stuck inside each other such that they cannot be separated when plural of the bowl-shaped members 30 are stacked in storage, and increases the stability when stacked. Furthermore, machine compatibility is improved by for example performing positioning with the rib 34 when a process to cut off the hard tip part of the clump is automated.

EXAMPLES

Explanation follows regarding an Example of the present invention by drawing comparison with a Comparative Example employing a related cap 70, with reference to photographs.

A cap for a cultivation bottle for brown beech mushrooms 10 according to the Example has the shape described in the first exemplary embodiment. The diameter of the first opening 21 in the cylindrical member 20 is 48 mm.

Figure 20A:
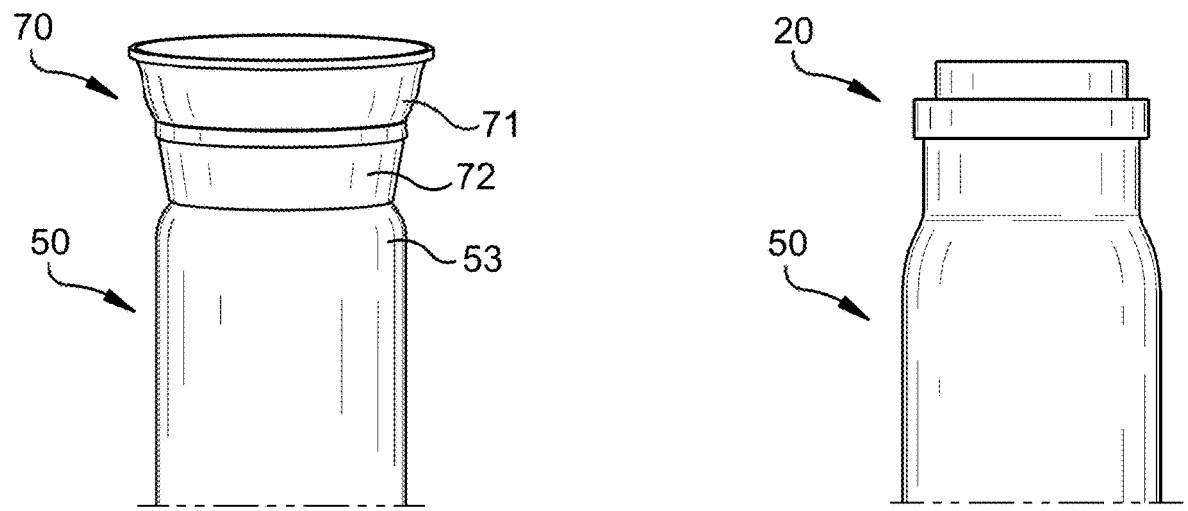
FIG. 20A illustrates a Comparative Example (left-hand photograph) and an Example (right-hand photograph) on growth day zero.

The related cap 70 according to the Comparative Example has the shape illustrated in the left-hand photograph in FIG. 20A. Specifically, a bowl-shaped upper part 71 and a truncated substantially circular conical shaped lower part 72 with a gradually decreasing diameter on progression downward are integrally formed by injection molding a polypropylene resin. The lower part 72 completely covers the neck part 52 from the outer side, and is supported by the sloping shoulder part 53.

The cultivation bottle 50 employed in cultivation has the shape illustrated in FIG. 1. The diameter of the opening of the wide-mouth part 54 is 55 mm. The proportional opening size of the first opening 21 in the cylindrical member 20 is thus 76% of that of the opening in the wide-mouth part 54.

Figure 20B:
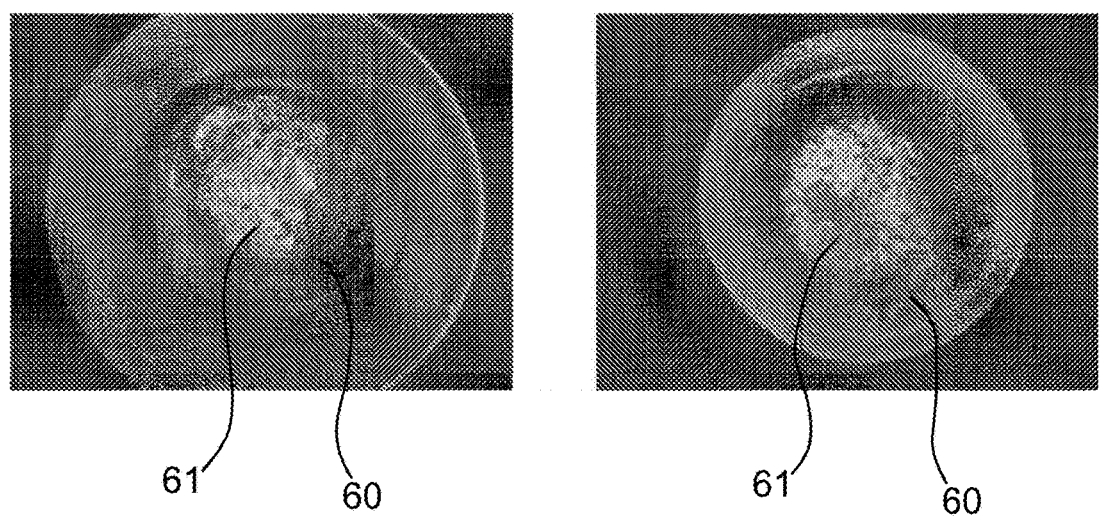
FIG. 20B illustrates a Comparative Example (left-hand photograph) and an Example (right-hand photograph) on growth day zero.

FIG. 20A illustrates the Comparative Example (left-hand photograph) and the Example (right-hand photograph) on growth day zero immediately following the scraping process (see (1-5-2)). FIG. 20B likewise illustrates the Comparative Example (left-hand photograph) and the Example (right-hand photograph). In FIG. 20A, the cultivation bottles 50 are viewed straight-on in a state in which the caps have been mounted thereto, and in FIG. 20B, the same state is viewed from overhead. The remnants of the spawn 61 can be seen in a substantially circular shape toward the center of the wide-mouth part 54 of the cultivation bottle 50 in both cases.

Figure 21A:
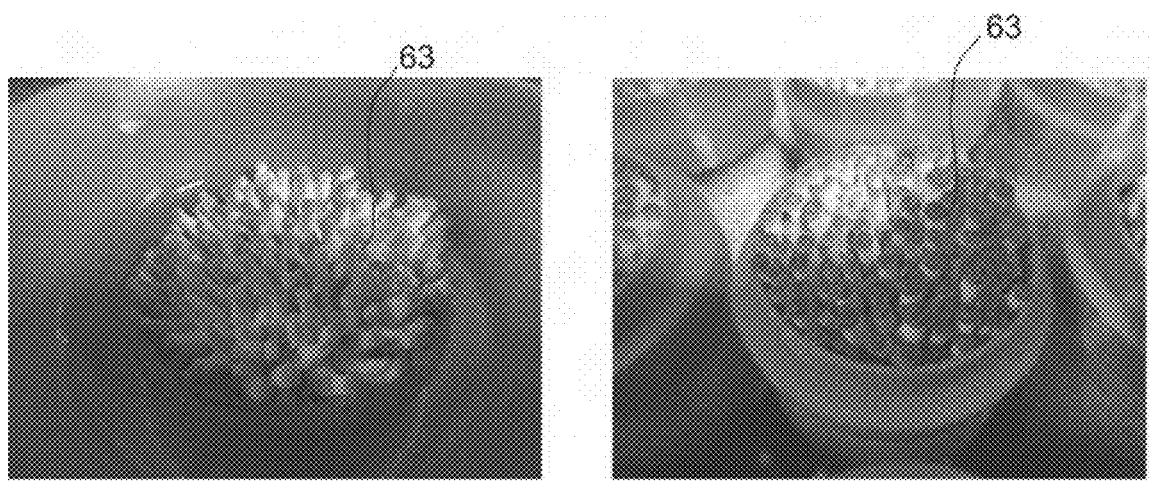
FIG. 21A illustrates a Comparative Example (left-hand photograph) and an Example (right-hand photograph) on growth day 13.
Figure 21B:
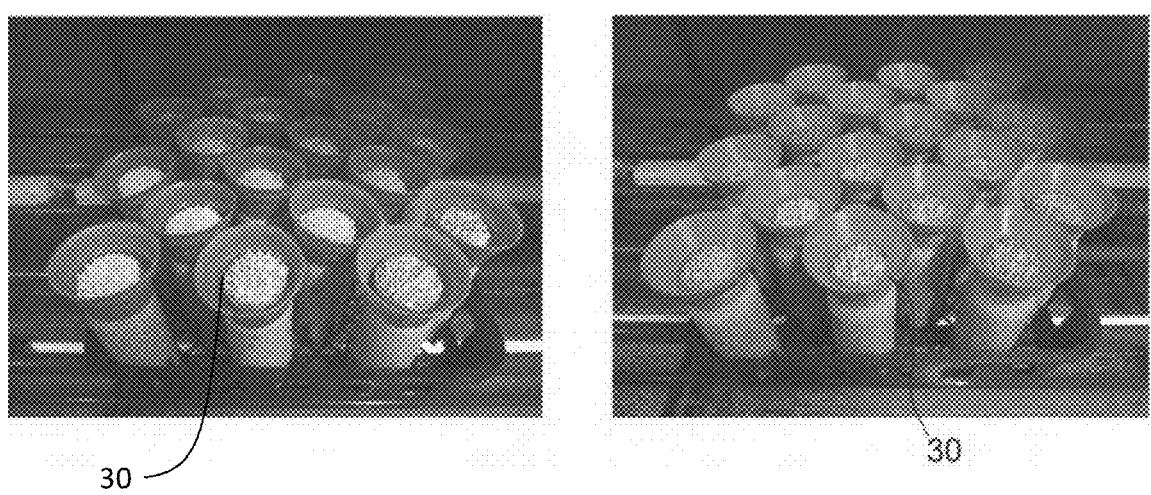
FIG. 21B illustrates a Comparative Example (left-hand photograph) and an Example (right-hand photograph) on growth day 13.

FIG. 21A illustrates the Comparative Example (left-hand photograph) and the Example (right-hand photograph) on growth day 13. FIG. 21B likewise illustrates the Comparative Example (left-hand photograph) and the Example (right-hand photograph) on growth day 13. In FIG. 21A, the growing state of the fruiting body 63 is viewed from diagonally overhead, whereas in FIG. 21B the cultivation bottles 50 are illustrated in rows in the growing chamber. In the Comparative Example, the fruiting body 63 has spread to fill the opening of the wide-mouth part 54 (left-hand photograph in FIG. 21A), whereas in the Example it can be seen that the fruiting body 63 is restricted within the range of the first opening 21 in the small-diameter cylindrical part 24 (right-hand photograph in FIG. 21A). The bowl-shaped member 30 is mounted in this state in the Example (right-hand photograph in FIG. 21B).

Figure 22A:
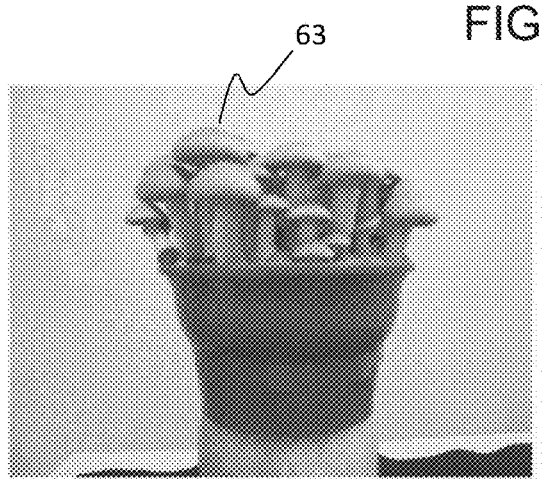
FIG. 22A illustrates a Comparative Example (left-hand photograph) and an Example (right-hand photograph) on growth day 21.
Figure 22A:
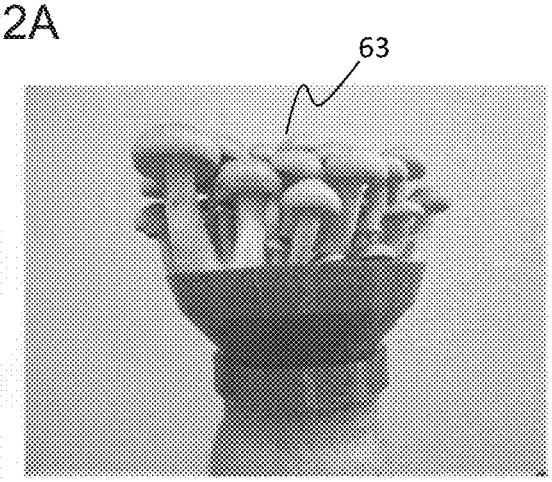
Figure 22B:
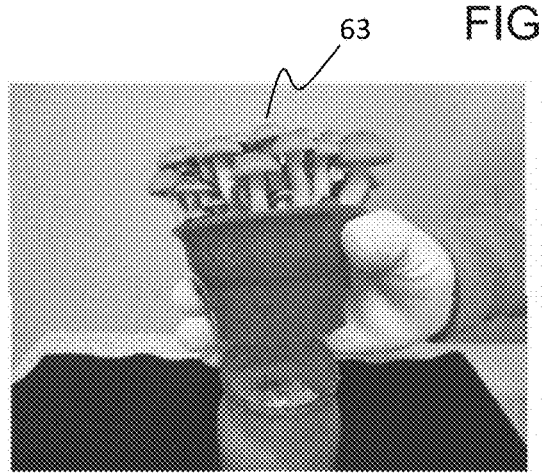
FIG. 22B illustrates a Comparative Example (left-hand photograph) and an Example (right-hand photograph) on growth day 21.
Figure 22B:
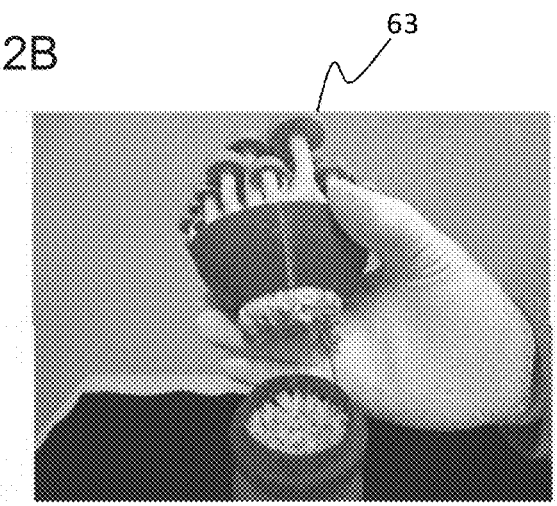
Figure 22C:
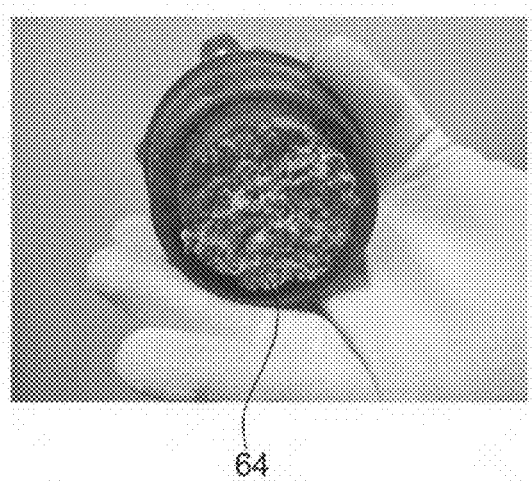
FIG. 22C illustrates a Comparative Example (left-hand photograph) and an Example (right-hand photograph) on growth day 21.
Figure 22C:
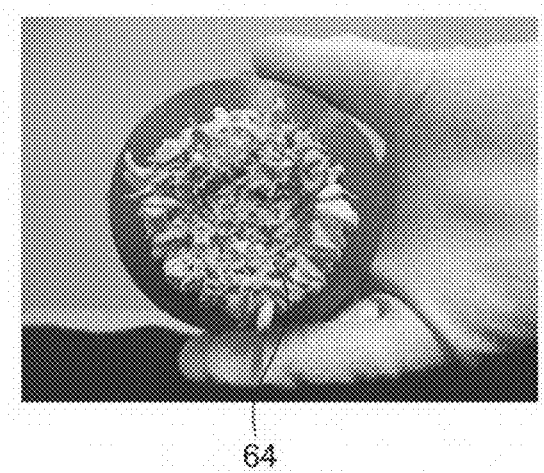

The left-hand photographs in FIG. 22A, FIG. 22B, and FIG. 22C illustrate the Comparative Example on growth day 21. The right-hand photographs in FIG. 22A, FIG. 22B, and FIG. 22C likewise illustrate the Example on growth day 21. In FIG. 22A, a growing state of the fruiting body 63 is viewed straight-on. FIG. 22B illustrates a state immediately after harvesting, and FIG. 22C illustrates a state of the hard tip part 64 immediately after harvesting as viewed from underneath. When the cap is lifted up and the brown beech mushroom is harvested in the Comparative Example, the hard tip part 64 taken up together with the cap has substantially the same diameter as the diameter of the wide-mouth part 54 of the cultivation bottle 50 (the left-hand photographs in FIG. 22B and FIG. 22C). The culture medium 60 has adhered to the entire lower surface of the hard tip part 64 (left-hand photograph in FIG. 22C). However, in the Example, although the brown beech mushrooms are harvested by lifting up the bowl-shaped member 30 similarly to in the Comparative Example, the hard tip part 64 has substantially the same diameter as the diameter of the small-diameter cylindrical part 24 (the right-hand photographs in FIG. 22B and FIG. 22C). Parts of the fruiting body 63 further to the peripheral outside are left in the cultivation bottle 50 (right-hand photograph in FIG. 22B). Only a very small amount of the culture medium 60 can be observed at the center of the lower face of the hard tip part 64 (right-hand photograph in FIG. 22C).

Figure 23A:
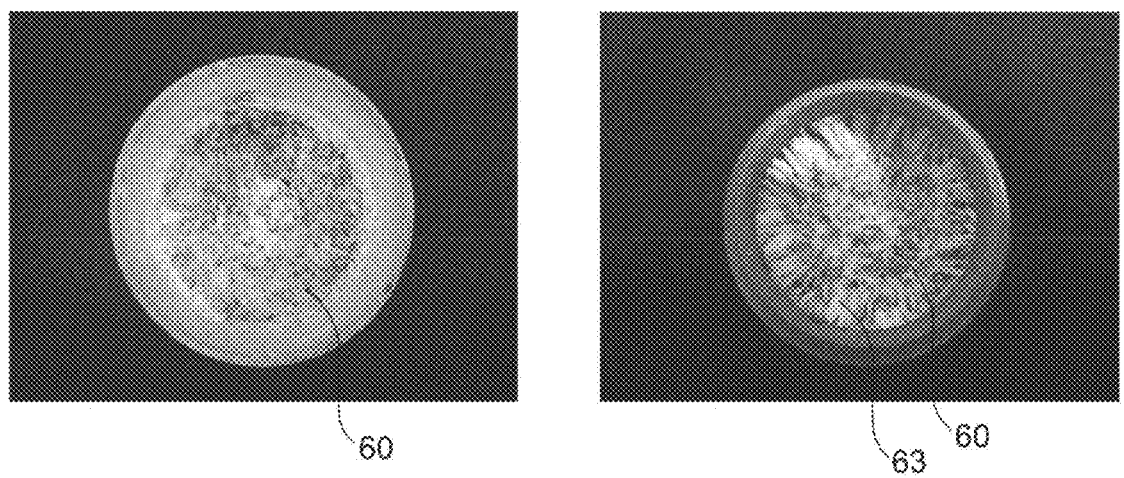
FIG. 23A illustrates a Comparative Example (left-hand photograph) and an Example (right-hand photograph) immediately after harvesting.
Figure 23B:
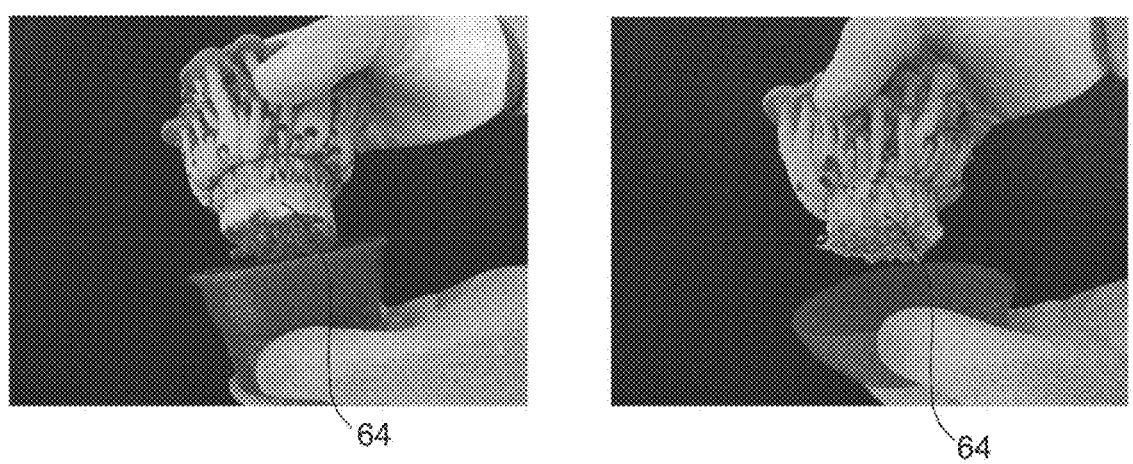
FIG. 23B illustrates a Comparative Example (left-hand photograph) and an Example (right-hand photograph) immediately after harvesting.
Figure 23C:
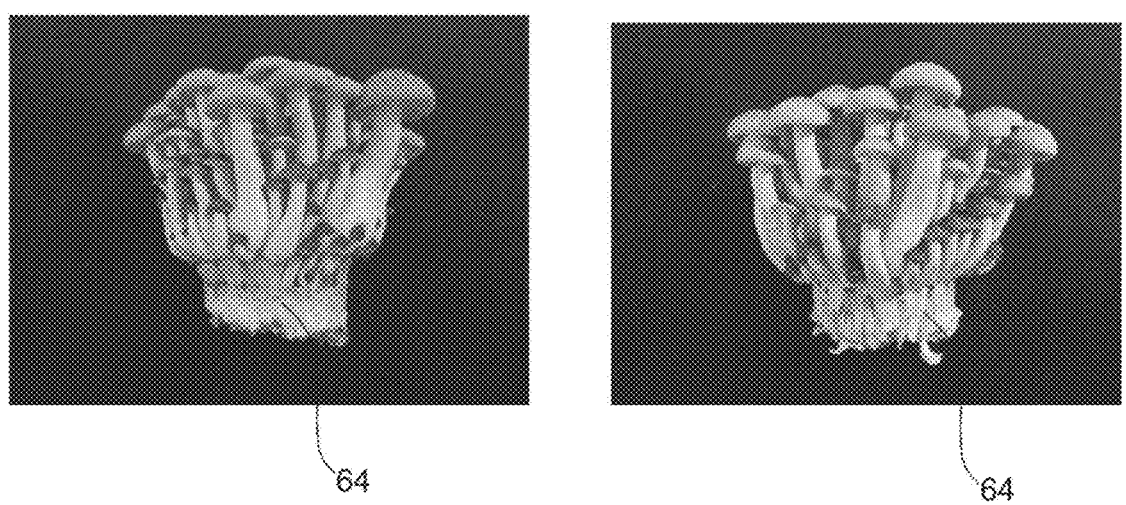
FIG. 23C illustrates a Comparative Example (left-hand photograph) and an Example (right-hand photograph) immediately after harvesting.

The left-hand photographs in FIG. 23A, FIG. 23B, and FIG. 23C illustrate the Comparative Example in a state immediately after harvesting. The right-hand photographs in FIG. 23A, FIG. 23B, and FIG. 23C similarly illustrate the Example in a state immediately after harvesting. FIG. 23A illustrates the cultivation bottles 50 from overhead after harvesting. In the Comparative Example, the fruiting body 63 has been almost entirely removed such that the culture medium 60 can be seen across almost the entire opening (left-hand photograph in FIG. 23A), whereas in the Example, undeveloped parts of the fruiting body 63 remain at an outer peripheral part of the opening, and the culture medium 60 can only be seen at a small central point (right-hand photograph in FIG. 23A). FIG. 23B illustrates a state immediately after the bowl-shaped member 30 has been removed, and FIG. 23C illustrates the clump after the bowl-shaped member 30 has been removed. In the Comparative Example, the lower half of the hard tip part 64 configures the fruiting body primordium 62 contaminated with the culture medium 60 (left-hand photographs in FIG. 23B and FIG. 23C), whereas in the Example this cannot be seen (right-hand photographs in FIG. 23B and FIG. 23C).

Figure 24A:
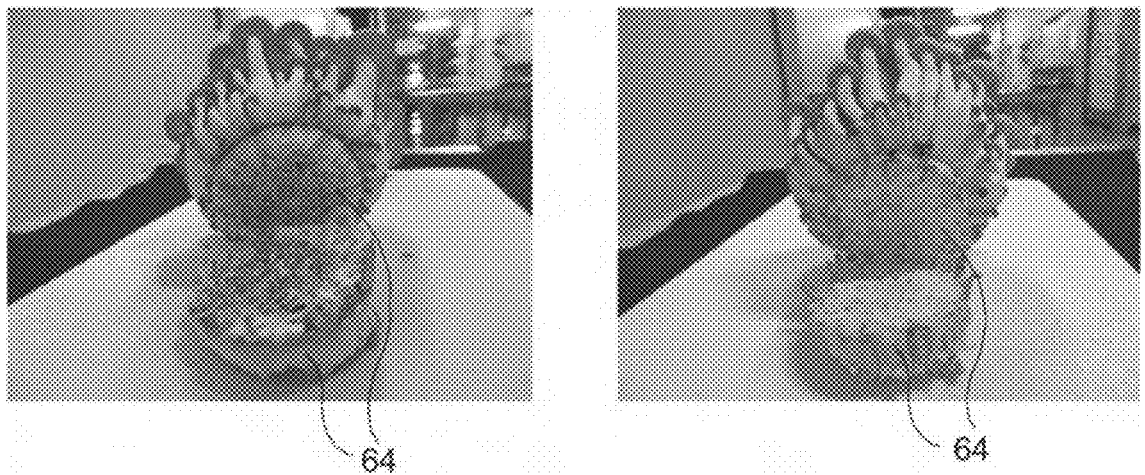
FIG. 24A illustrates a state of a hard tip part after harvesting in a Comparative Example (left-hand photograph) and an Example (right-hand photograph).
Figure 24B:
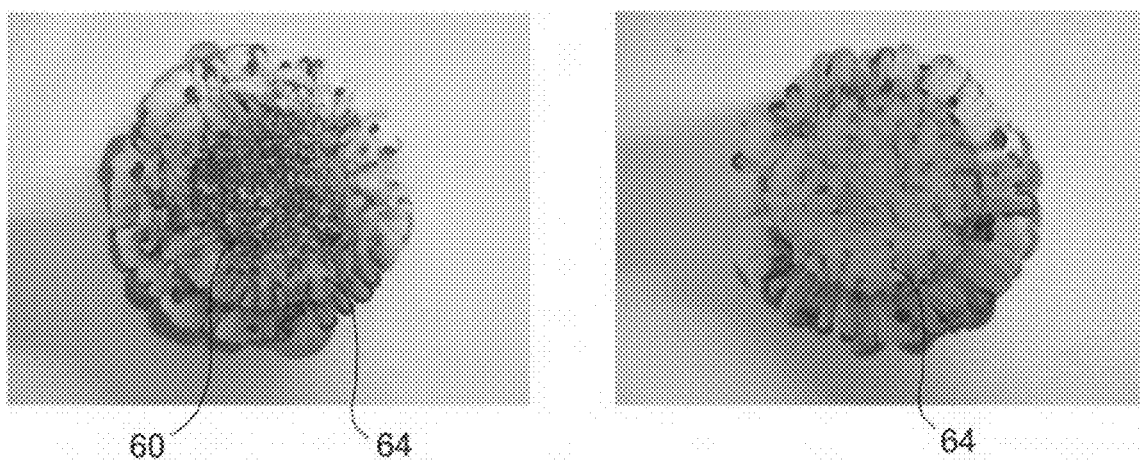
FIG. 24B illustrates a state of a hard tip part after harvesting in a Comparative Example (left-hand photograph) and an Example (right-hand photograph).
Figure 24C:
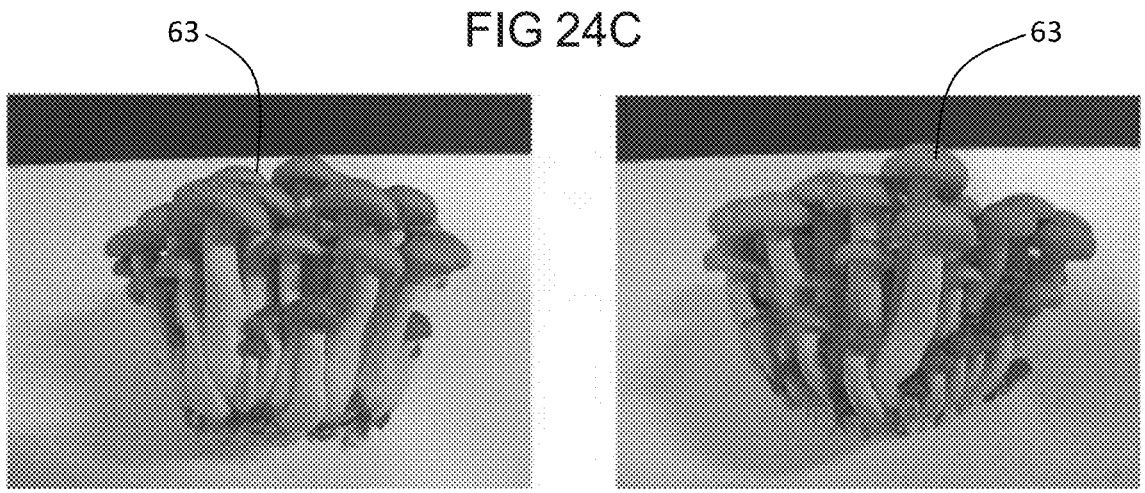
FIG. 24C illustrates a state of a hard tip part after harvesting in a Comparative Example (left-hand photograph) and an Example (right-hand photograph).
Figure 25A:
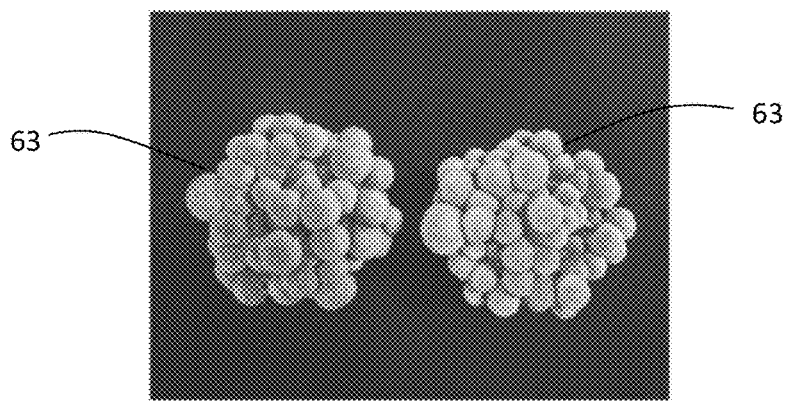
FIG. 25A is a plan view illustrating a Comparative Example (left) and an Example (right) placed alongside each other in a state immediately prior to product shipping.
Figure 25B:
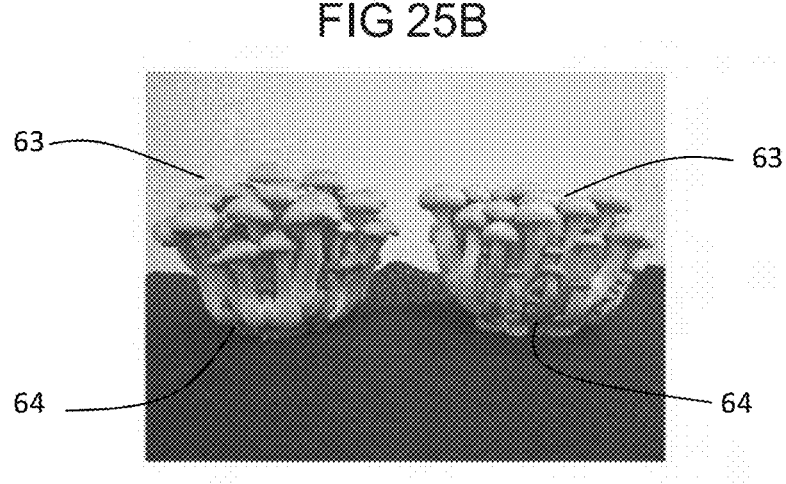
FIG. 25B is a perspective view from above illustrating a Comparative Example (left) and an Example (right) placed alongside each other in a state immediately prior to product shipping.
Figure 25C:
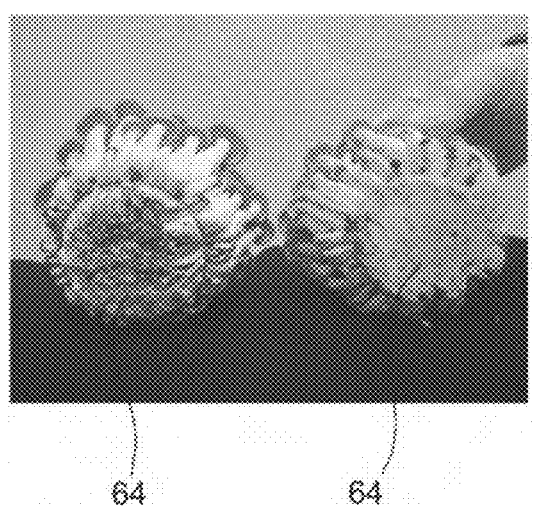
FIG. 25C is a bottom view illustrating a Comparative Example (left) and an Example (right) placed alongside each other in a state immediately prior to product shipping.
Figure 25D:
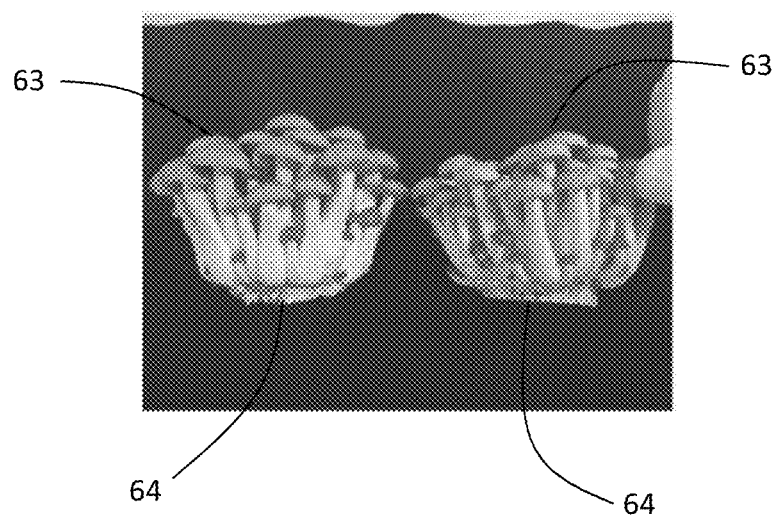
FIG. 25D is a front view illustrating a Comparative Example (left) and an Example (right) placed alongside each other in a state immediately prior to product shipping.
Figure 26A:
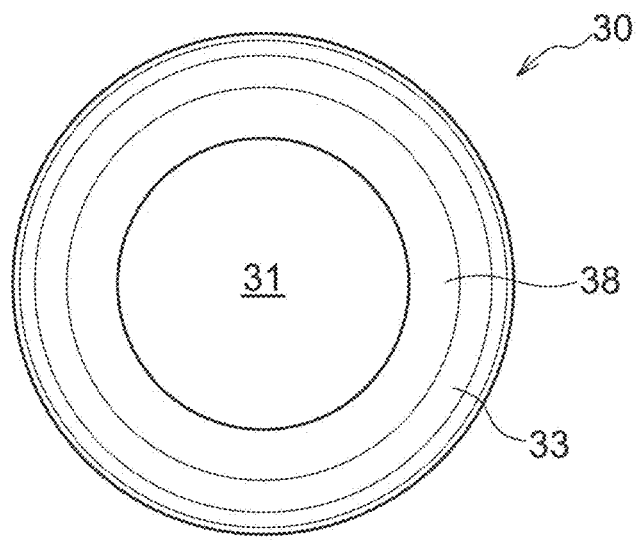
FIG. 26A is a plan view illustrating a bowl-shaped member of a cap for a cultivation bottle for brown beech mushrooms according to a fourth exemplary embodiment.
Figure 26B:
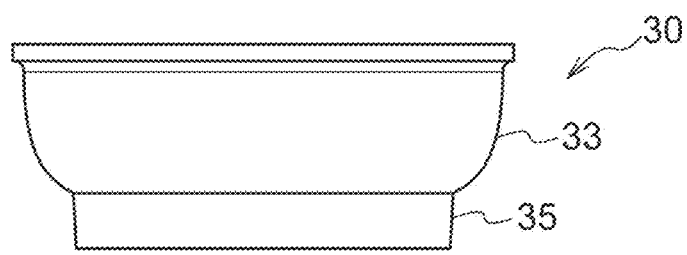
FIG. 26B is a front view illustrating a bowl-shaped member of a cap for a cultivation bottle for brown beech mushrooms according to the fourth exemplary embodiment.
Figure 26C:
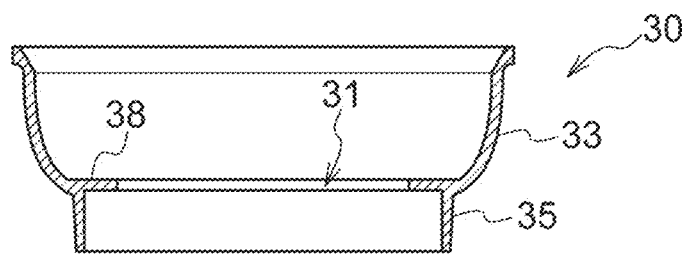
FIG. 26C is a front view cross-section illustrating a bowl-shaped member of a cap for a cultivation bottle for brown beech mushrooms according to the fourth exemplary embodiment.
Figure 26D:
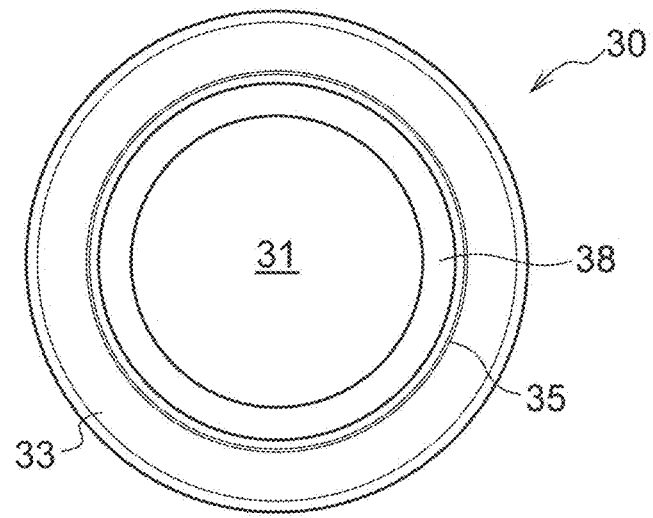
FIG. 26D is a bottom view illustrating a bowl-shaped member of a cap for a cultivation bottle for brown beech mushrooms according to the fourth exemplary embodiment.

The left-hand photographs in FIG. 24A, FIG. 24B, and FIG. 24C illustrate a state of the hard tip part 64 in the Comparative Example after harvesting. The right-hand photographs in FIG. 24A, FIG. 24B, and FIG. 24C similarly illustrate a state of the hard tip part 64 in the Example after harvesting. In the Comparative Example, although the fruiting body primordium 62 making up the lower half of the hard tip part 64 can be easily pulled away (left-hand photograph in FIG. 24A), a significant amount of the culture medium 60 still remains on a lower face of the remaining upper half of the hard tip part 64 after being pulled away (left-hand photograph in FIG. 24B). However, in the Example, when the hard tip part 64 is cut off at a midsection location (right-hand photograph in FIG. 24A), none of the culture medium 60 can be seen on the lower surface of the cut upper half (right-hand photograph in FIG. 24B). Note that there is no real difference in appearance between the Comparative Example and the Example when the brown beech mushrooms viewed straight-on (left-hand photograph and right-hand photograph in FIG. 24C).

FIG. 25A to FIG. 25D illustrate the Comparative Example (left) and the Example (right) placed side-by-side in a state immediately prior to being shipped as commercial products. As seen in plan view (FIG. 25A), in perspective view from overhead (FIG. 25B), and in front view (FIG. 25D), except for the point that the Comparative Example appears somewhat larger, there is no real observable difference in growth. The Comparative Example is thought to appear somewhat larger since in the Example, the opening of the wide-mouth part 54 of the cultivation bottle 50 is restricted to a smaller diameter by the small-diameter cylindrical part 24. However, in bottom view (FIG. 25C), the culture medium 60 has adhered in the Comparative Example, whereas no adhesion of the culture medium 60 can be seen in the Example. There is accordingly no need to cut off and dispose of the hard tip part 64 when cooking food with the Example, enabling the all of the brown beech mushrooms including the hard tip part 64 to be eaten.

INDUSTRIAL APPLICABILITY

The present invention can be utilized in brown beech mushroom cultivation.

The invention claimed is:

1. A cap assembly for a cultivation bottle for mushrooms, the cap assembly comprising:
   a bottle fitting member configured to fit onto a mouth part of a cultivation bottle, and
   a bowl-shaped member configured to be placed on the bottle fitting member,
      wherein the bowl-shaped member comprises:
         a base portion at a first end;
         an upper edge at an opposite second end;
         a bowl-shaped portion rising upward from the base portion to the upper edge, the bowl-shaped portion having an arcuate inner surface; and
      an internal hollow cylindrical portion positioned within the bowl-shaped portion on the base portion and projecting upwardly beyond at least a portion of the arcuate inner surface towards the upper edge;
         wherein the internal hollow cylindrical portion corresponds to the bottle fitting member and is configured to increase the height of the bottle fitting member above the mouth part of the cultivation bottle, to thereby elongate a hard tip portion of mushroom fruiting bodies growing in the cultivation bottle and up through the cap assembly; and
      wherein the bowl-shaped member is configured to be separable from the bottle fitting member to facilitate harvesting of the mushroom fruiting bodies and removal of a section of the elongated hard tip portion.

2. The cap assembly of claim 1, wherein the internal hollow cylindrical portion is entirely below the upper edge of the bowl-shaped member.

3. The cap assembly of claim 2, wherein a combined height of the internal hollow cylindrical portion and a corresponding portion of the bottle fitting member above the cultivation bottle is between 6 mm and 30 mm.

4. The cap assembly of claim 1, wherein the bowl-shaped member further comprises:
   a plurality of outwardly-projecting ribs arranged around an outer face thereof.

5. The cap assembly of claim 1, wherein the bottle fitting member further comprises:
   a large-diameter hollow cylindrical part configured to cover an outer periphery of the mouth part of the cultivation bottle;
   a small-diameter hollow cylindrical part positioned above and concentrically with the large-diameter hollow cylindrical part and having an inner diameter smaller than an inner diameter of the large-diameter hollow cylindrical part; and
   a connecting part that extends laterally and connects the large-diameter hollow cylindrical part with the small-diameter hollow cylindrical part.

6. The cap assembly of claim 5, wherein the base portion of the bowl-shaped member has an inner diameter that is larger than an outer diameter of the small-diameter hollow cylindrical part such that the base portion of the bowl-shaped member circumscribes the small-diameter hollow cylindrical part when placed on the bottle fitting member.

7. The cap assembly of claim 5, wherein the large-diameter hollow cylindrical part of the bottle fitting member comprises:
   a plurality of inwardly-projecting anchor protrusions arranged around an inner peripheral surface;
   wherein the plurality of anchor protrusions are configured to attach the bottle fitting member to the mouth part of the cultivation bottle.

8. The cap assembly of claim 5, wherein a combined height of the internal hollow cylindrical portion of the bowl-shaped member and the corresponding small-diameter hollow cylindrical part of the bottle fitting member is between 6 mm and 30 mm.

9. A cap assembly for a cultivation bottle for mushrooms, the cap assembly comprising:
   a bottle fitting member comprising:
      a large-diameter hollow cylindrical part configured to cover an outer periphery of a mouth part of the cultivation bottle;
      a small-diameter hollow cylindrical part positioned above and concentrically with the large-diameter hollow cylindrical part and having an inner diameter smaller than an inner diameter of the large-diameter hollow cylindrical part; and
      a connecting part that extends laterally and connects the large-diameter hollow cylindrical part with the small-diameter hollow cylindrical part; and
   a bowl-shaped member comprising:
      a base portion at a first end;
      an upper edge at an opposite second end;
      a bowl-shaped portion rising upward from the base portion to the upper edge, the bowl-shaped portion having an arcuate inner surface; and
      an internal hollow cylindrical portion positioned within the bowl-shaped portion on the base portion and projecting upwardly beyond at least a portion of the arcuate inner surface towards the upper edge;
   wherein the internal hollow cylindrical portion of the bowl-shaped member has an inner diameter that corresponds to the inner diameter of the small-diameter hollow cylindrical part of the bottle fitting member and is configured to elongate a hard tip portion of mushroom fruiting bodies growing in the cultivation bottle and up through the cap assembly; and
   wherein the bowl-shaped member is configured to be separable from the bottle fitting member to facilitate harvesting of the mushroom fruiting bodies and removal of a section of the elongated hard tip portion.

10. The cap assembly of claim 9, wherein the hollow internal cylindrical portion of the bowl-shaped member is entirely below the upper edge of the bowl-shaped member.

11. The cap assembly of claim 9, wherein a combined height of the internal hollow cylindrical portion of the bowl-shaped member and the small-diameter hollow cylindrical part of the bottle fitting member is between 6 mm and 30 mm.

12. The cap assembly of claim 9, wherein the bowl-shaped member further comprises:
   a plurality of outwardly-projecting ribs arranged around an outer face thereof.

13. The cap assembly of claim 9, wherein the large-diameter hollow cylindrical part of the bottle fitting member comprises:
   a plurality of inwardly-projecting anchor protrusions arranged around an inner peripheral surface;
   wherein the plurality of anchor protrusions are configured to attach the bottle fitting member to the mouth part of the cultivation bottle.

14. A method of growing and harvesting mushrooms in a cultivation bottle using a cap assembly, comprising:
   mounting a cap assembly on a mouth part of the cultivation bottle for growing mushrooms;
   growing the mushrooms from inside the cultivation bottle and up through the cap assembly;
   harvesting the mushrooms after growth of the mushrooms has ended; and
   cutting off a hard tip part of a harvested mushroom at a midsection location, wherein the cap assembly comprises:
   a bottle fitting member configured to fit onto the mouth part of the cultivation bottle, and
   a bowl-shaped member configured to be placed on the bottle fitting member, wherein the bowl-shaped member comprises:
   a base portion at a first end;
   an upper edge at an opposite second end;
   a bowl-shaped portion rising upward from the base portion to the upper edge, the bowl-shaped portion having an arcuate inner surface; and
   an internal hollow cylindrical portion positioned within the bowl-shaped portion on the base portion and projecting upwardly beyond at least a portion of the arcuate inner surface towards the upper edge;
   wherein the internal hollow cylindrical portion corresponds to the bottle fitting member and is configured to increase the height of the bottle fitting member above the mouth part of the cultivation bottle, to thereby elongate a hard tip portion of mushroom fruiting bodies growing in the cultivation bottle and up through the cap assembly.

15. The method of claim 14, wherein the bottle fitting member includes:
   a large-diameter hollow cylindrical part configured to cover an outer periphery of the mouth part of the cultivation bottle;
   a small-diameter hollow cylindrical part positioned above and concentrically with the large-diameter cylindrical part and having a diameter smaller than a diameter of the large-diameter hollow cylindrical part; and a connecting part that extends laterally and connects the large-diameter hollow cylindrical part with the small-diameter hollow cylindrical part; and wherein mounting the cap assembly to the cultivation bottle comprises:

covering the mouth part of the cultivation bottle with the large-diameter hollow cylindrical part of the bottle fitting member;

placing the bowl-shaped member on the small-diameter hollow cylindrical part of the bottle fitting member; and wherein the bowl-shaped member is configured to be separable from the bottle fitting member, to facilitate harvesting of the mushroom fruiting bodies and removal of a section of the elongated hard tip portion.

16. The method of claim 15, wherein a combined height of the internal hollow cylindrical portion of the bowl-shaped member and the small-diameter hollow cylindrical part of the bottle fitting member is between 6 mm and 30 mm.

* * * * *